(12) United States Patent
Diamond et al.

(10) Patent No.: US 9,175,107 B2
(45) Date of Patent: *Nov. 3, 2015

(54) METHOD FOR PRODUCING VERY-HIGH OR ULTRA-HIGH MOLECULAR WEIGHT POLYETHYLENE

(71) Applicant: Symyx Solutions, Inc., Sunnyvale, CA (US)

(72) Inventors: Gary M. Diamond, Menlo Park, CA (US); Margarete K. Leclerc, Mountain View, CA (US); Guang Zhu, Foster City, CA (US)

(73) Assignee: Symyx Solutions, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,085

(22) Filed: Jan. 8, 2014

(65) Prior Publication Data

US 2014/0121342 A1     May 1, 2014

Related U.S. Application Data

(63) Continuation of application No. 12/645,030, filed on Dec. 22, 2009, now Pat. No. 8,637,618.

(60) Provisional application No. 61/141,963, filed on Dec. 31, 2008.

(51) Int. Cl.
| | | |
|---|---|---|
| *C08F 4/76* | (2006.01) | |
| *C08F 10/02* | (2006.01) | |
| *C08F 10/00* | (2006.01) | |
| *C08F 110/02* | (2006.01) | |
| *C08F 4/64* | (2006.01) | |

(52) U.S. Cl.
CPC . *C08F 4/76* (2013.01); *C08F 10/00* (2013.01); *C08F 110/02* (2013.01); *C08F 4/64193* (2013.01); *C08F 2500/01* (2013.01)

(58) Field of Classification Search
CPC ... C08F 4/64193; C08F 10/02; C08F 2500/01
USPC ................................. 526/172, 348, 352, 161
See application file for complete search history.

(56) References Cited

U.S. PATENT DOCUMENTS

| | | | |
|---|---|---|---|
| 6,051,525 A | 4/2000 | Lo et al. | |
| 6,841,502 B2 * | 1/2005 | Boussie et al. | 502/125 |
| 6,869,904 B2 * | 3/2005 | Boussie et al. | 502/171 |
| 6,887,958 B1 * | 5/2005 | Mihan et al. | 526/161 |
| 6,897,276 B2 * | 5/2005 | Boussie et al. | 526/172 |
| 8,071,701 B2 * | 12/2011 | Klosin et al. | 526/170 |
| 2006/0052554 A1 | 3/2006 | Boussie | |
| 2006/0135713 A1 | 6/2006 | Leclerc et al. | |

OTHER PUBLICATIONS

International Search Report and Written Opinion for International Application No. PCT/US09/69272, mailed Mar. 10, 2010.

* cited by examiner

*Primary Examiner* — Rip A Lee
(74) *Attorney, Agent, or Firm* — McDermott, Will & Emery LLP

(57) ABSTRACT

The field of the invention relates generally to a method for preparing very-high or ultra-high molecular weight polyethylene. More particularly, the present invention related to a method of preparing very-high or ultra-high molecular weight polyethylene using a supported catalyst comprising a support, an activator and a metal-ligand complex, as well as the catalyst itself. The present invention additionally relates to a method of using a supported catalyst comprising a support, an activator and co-supported metal-ligand complexes to obtain a bi-modal molecular weight distribution of polyethylene.

11 Claims, 8 Drawing Sheets

METHOD FOR PRODUCING VERY-HIGH OR ULTRA-HIGH MOLECULAR WEIGHT POLYETHYLENE

CROSS-REFERENCE TO RELATED APPLICATION

This application is a continuation of U.S. patent application Ser. No. 12/645,030, filed Dec. 22, 2009 and now issued as U.S. Pat. No. 8,637,618, which claims the benefit of priority from U.S. Provisional Patent Application Ser. No. 61/141,963, filed Dec. 31, 2008, the entire contents of each of which are incorporated herein by reference.

BACKGROUND

The field of the invention relates generally to a method for preparing very-high or ultra-high molecular weight polyethylene. More particularly, the present invention relates to a method of preparing very-high or ultra-high molecular weight polyethylene using a supported catalyst comprising a support, an activator and a metal-ligand complex, as well as the catalyst itself. The present invention additionally relates to a method of using a supported catalyst comprising a support, an activator and co-supported metal-ligand complexes to obtain very-high or ultra-high molecular weight polyethylene with a bi-modal molecular weight distribution.

Ancillary (or spectator) ligand-metal coordination complexes (e.g., organometallic complexes) and compositions are useful as catalysts, additives, stoichiometric reagents, solid-state precursors, therapeutic reagents and drugs. Ancillary ligand-metal coordination complexes of this type can be prepared by combining an ancillary ligand with a suitable metal compound or metal precursor in a suitable solvent at a suitable temperature. The ancillary ligand contains functional groups that bind to the metal center(s), remain associated with the metal center(s), and therefore provide an opportunity to modify the steric, electronic and chemical properties of the active metal center(s) of the complex.

Certain known ancillary ligand-metal complexes and compositions are catalysts for reactions such as oxidation, reduction, hydrogenation, hydrosilylation, hydrocyanation, hydroformylation, polymerization, carbonylation, isomerization, metathesis, carbon-hydrogen activation, carbon-halogen activation, cross-coupling, Friedel-Crafts acylation and alkylation, hydration, dimerization, trimerization, oligomerization, Diels-Alder reactions and other transformations.

One example of the use of these types of ancillary ligand-metal complexes and compositions is in the field of polymerization catalysis. In connection with single site catalysis, the ancillary ligand typically offers opportunities to modify the electronic and/or steric environment surrounding an active metal center. This allows the ancillary ligand to assist in the creation of possibly different polymers. Group 4 metallocene based single site catalysts are generally known for polymerization reactions. See, generally, "Chemistry of Cationic Dicyclopentadienyl Group 4 Metal-Alkyl Complexes", Jordan, Adv. Organometallic Chem., 1991, Vol. 32, pp. 325-153 and the references therein, all of which is incorporated herein by reference. One application for metallocene catalysts is in the production of polyolefins, such as in the production of polyethylene.

A type of polyethylene of particular value is ultra-high molecular weight polyethylene ("UHMWPE"). Ultra High Molecular Weight Polyethylene is a valuable engineering plastic, with a unique combination of abrasion resistance, surface lubricity, chemical resistance, and impact strength, and very high tensile strength as a fiber. See, for example, Stein, H. L., Ultra High Molecular Weight Polyethylene (UHMWPE), pp. 167-171, in ENGINEERED MATERIALS HANDBOOK, Volume 2: Engineering Plastics, ASM International, 1998. Industrial uses include, for example, liners for bulk material handling, nautical rope, truck bed linings and metal shaft bushings. UHMWPE is the product of a cheap monomer (ethylene) and a relatively simple process (typical slurry HDPE processes), using fairly conventional Ziegler catalysts. See, for example, U.S. Pat. No. 5,587,440 and EP 0575840 B1.

Ultra-high molecular weight polyethylene may typically be characterized by a molecular weight of at least about $3 \times 10^6$ g/mol, with molecular weights from about $3 \times 10^6$ g/mol to about $10 \times 10^6$ g/mol being typical. In contrast, very-high molecular weight polyethylene may typically be characterized by a molecular weight from about $1 \times 10^6$ g/mol to less than about $3 \times 10^6$ g/mol and high molecular weight polyethylene may typically be characterized by a molecular weight of greater than about $3 \times 10^5$ g/mol to less than about $1 \times 10^6$ g/mol. Conventional UHMWPE resin does not exhibit a measurable melt index and cannot be processed using conventional polyolefin melt processing techniques such as, for example, injection molding, blow molding, rotomolding or film blowing or casting. Rather, UHMWPE is conventionally processed by compression molding or ram extrusion. Compression molding and ram extrusion are relatively slow processing techniques and require products to be machined from the resulting sheets or rods. The main limitation to wider use of UHMWPE is the difficulty of processability.

Broad or bimodal molecular weight distribution polymer compositions are compositions that typically include one or more high molecular weight polymers and one or more low molecular weight polymers. In bimodal molecular weight distribution polymer compositions, the weight fraction of the high molecular weight polymer may range from, for example, 0.10 to 0.90. The relative amount of high molecular weight polymer in the polymer composition can influence the rheological properties of the composition. One such measurable rheological property of bimodal polymer compositions is its melt flow rate (e.g. $I_{21}$, measured at 190° C., with a 21.6 kg load according to ASTM D-1238). By increasing the weight fraction of low molecular weight polymers in the polymer composition, the polymer composition may generally exhibit improved flow characteristics.

Conventional techniques to improve the processability of UHMWPE involve the melt blending of a lower molecular weight polymer with UHMWPE compositions, or involve use of two reactors in series. Such techniques have generally proven to be insufficient due to difficulty in uniformly dispersing the lower molecular weight polymer into the composition. Such poorly blended compositions are characterized by a decrease in impact strength and wear resistance compared to unblended UHMWPE.

While the melt processability to the UHMWPE can be greatly improved by blending with lower molecular weight polymers, this comes at the price of reduction in the key desirable properties of UHMWPE. One problem is the difficulty of achieving a homogeneous blended product. The extremely low melt viscosity of the UHMWPE makes it very difficult to fully dissolve & disperse the UHMWPE particles, resulting in a "pumpable slurry" in the worst cases. This results in a marked decrease in impact strength and wear resistance compared to unblended UHMWPE. See, for example, U.S. Pat. No. 4,110,391, U.S. Pat. No. 4,281,070, U.S. Pat. No. 4,786,687, U.S. Pat. No. 4,923,935, U.S. Pat. No. 5,079,287, U.S. Pat. No. 5,393,473, U.S. Pat. No. 5,422, 061, U.S. Pat. No. 5,422,061, U.S. Pat. No. 5,658,992, U.S. Pat. No. 6,521,709, U.S. Pat. No. 6,790,923, and WO 02/046297.

Melt-processable blends of UHMWPE and HDPE (high density polyethylene) have also been prepared using 2-stage reactor technology. Typically, ethylene is polymerized in the absence of hydrogen to produce UHMWPE in the first stage, then in the presence of hydrogen to produce lower molecular weight HDPE in the second stage. Resulting granular products are intra-granular blends. See for example U.S. Pat. No. 4,786,687, EP 0274536 B2, both employing conventional Ziegler catalysts.

It has been demonstrated that bimodal polyethylenes may be prepared by simultaneous polymerization of ethylene (and optionally α-olefin comonomer(s)) to produce a lower molecular weight polyethylene component and a high molecular weight polyethylene component by use of co-supported "bimetallic" catalysts in a single reactor (see, for example, U.S. Pat. No. 5,032,562, U.S. Pat. No. 5,539,076, U.S. Pat. No. 5,614,456, U.S. Pat. No. 6,051,525, WO 02/090393, WO 02/44222, and WO 03/048213, the entire contents of which are incorporated herein by reference for all relevant and consistent purposes). The resulting compositions possess a high degree of dispersion due to the intra-granular blending that occurs during the simultaneous polymerization. Compared to series-reactor products, improved intra-granular blending is possible by growing both components simultaneously. While these in-reactor blends produced by use of co-supported catalysts in a single reactor have been demonstrated for polyethylenes with regular and high molecular weights, catalyst systems capable of producing bimodal ultra-high molecular weight polyethylene have not been effectively demonstrated.

UHMWPE fibers are typically produced using a gel spinning process, typically using a 2-step process that produces fibers with highly oriented UHMWPE chains, resulting in superb tensile strength. See, for example, U.S. Pat. No. 4,137,394, U.S. Pat. No. 4,356,138, U.S. Pat. No. 4,413,110, and U.S. Pat. No. 7,147,807. UHMWPE compositions with narrow molecular weight distributions may offer improved properties for fiber applications.

In view of the foregoing, a need continues to exist for catalyst compositions that may be used to prepare ultra-high molecular weight polyolefins, and in particular UHMWPE compositions, with desirable molecular weight distribution (MWD), either narrow MWD (e.g. for fiber applications), or bimodal MWD (e.g. for improved melt flow properties). Additionally, a need exists for catalyst compositions that may be used to produce UHMWPE compositions with a bimodal molecular weight distribution, thus avoiding the need for blending and problems associated therewith. A further need exists for methods of producing UHMWPE that provide for the production of such polymers that have a specific target molecular weight and molecular weight distribution.

BRIEF SUMMARY

Briefly, therefore, the present invention is directed to a slurry polymerization method for producing a very-high ultra-high molecular weight polyethylene composition. The method comprises contacting one or more monomers with a supported catalyst, the supported catalyst comprising: (i) a support; (ii) a metal-ligand complex deposited on the support at a loading of from about 1 μmol/gram of supported catalyst to about 100 μmol/gram of supported catalyst, the metal-ligand complex characterized by the general formula:

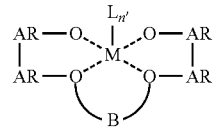

wherein at least two of the bonds from the oxygens (O) to M are covalent, with the other bonds being dative; AR is an aromatic group that can be the same or different from the other AR groups with each AR being independently selected from the group consisting of optionally substituted aryl and optionally substituted heteroaryl; B is a bridging group having from 3 to 50 atoms not counting hydrogen atoms and is selected from the group consisting of optionally substituted divalent hydrocarbyl and optionally substituted divalent heteroatom-containing hydrocarbyl; M is a metal selected from the group consisting of Hf and Zr; each L is independently a moiety that forms a covalent dative or ionic bond with M; and n' is 1, 2, 3 or 4; and, (iii) an activator.

The present invention is further directed to a slurry polymerization method for producing a very-high or ultra-high molecular weight polyethylene composition. The method comprises contacting one or more monomers with a two component co-supported catalyst, the co-supported catalyst comprising: (i) a support; (ii) two different metal-ligand complexes deposited on the support, wherein each metal-ligand complex is independently characterized by the general formula:

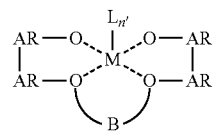

wherein at least two of the bonds from the oxygens (O) to M are covalent, with the other bonds being dative; AR is an aromatic group that can be the same or different from the other AR groups with each AR being independently selected from the group consisting of optionally substituted aryl and optionally substituted heteroaryl; B is a bridging group having from 3 to 50 atoms not counting hydrogen atoms and is selected from the group consisting of optionally substituted divalent hydrocarbyl and optionally substituted divalent heteroatom-containing hydrocarbyl; M is a metal selected from the group consisting of Hf and Zr; each L is independently a moiety that forms a covalent dative or ionic bond with M; and n' is 1, 2, 3 or 4; and, (iii) an activator.

The present invention is still further directed to a slurry polymerization method for producing a polyethylene composition having a broad or bimodal molecular weight distribution, the composition comprising a first polyethylene component that is a very-high or ultra-high molecular weight polyethylene component and a second polyethylene component that is a very-high or high molecular weight polyethylene component. The method comprises contacting one or more monomers with a two component co-supported catalyst, the co-supported catalyst comprising: (i) a support; (ii) two different metal-ligand complexes deposited on the support, wherein each metal-ligand complex is independently characterized by the general formula:

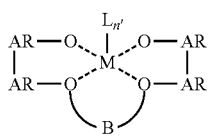

wherein at least two of the bonds from the oxygens (O) to M are covalent, with the other bonds being dative; AR is an aromatic group that can be the same or different from the other AR groups with each AR being independently selected from the group consisting of optionally substituted aryl and heteroaryl; B is a bridging group having from 3 to 50 atoms not counting hydrogen atoms and is selected from the group consisting of optionally substituted divalent hydrocarbyl and optionally substituted divalent heteroatom-containing hydrocarbyl; M is a metal selected from the group consisting of Hf and Zr; each L is independently a moiety that forms a covalent dative or ionic bond with M; and n' is 1, 2, 3 or 4; and, (iii) an activator, wherein one of the metal-ligand complexes of the co-supported catalyst produces the first polyethylene component and the other metal-ligand complex of the co-supported catalyst produces the second polyethylene component.

The present invention is still further directed to one or more of the above-noted methods additionally comprising the step of isolating or obtaining an ultra-high molecular weight polymer after the supported catalyst (or co-supported catalyst) and the one or more monomers have been contacted.

The present invention is still further directed to one or more of the supported catalysts (or co-supported catalysts) detailed in the methods described above or elsewhere herein.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION

Figure 1:
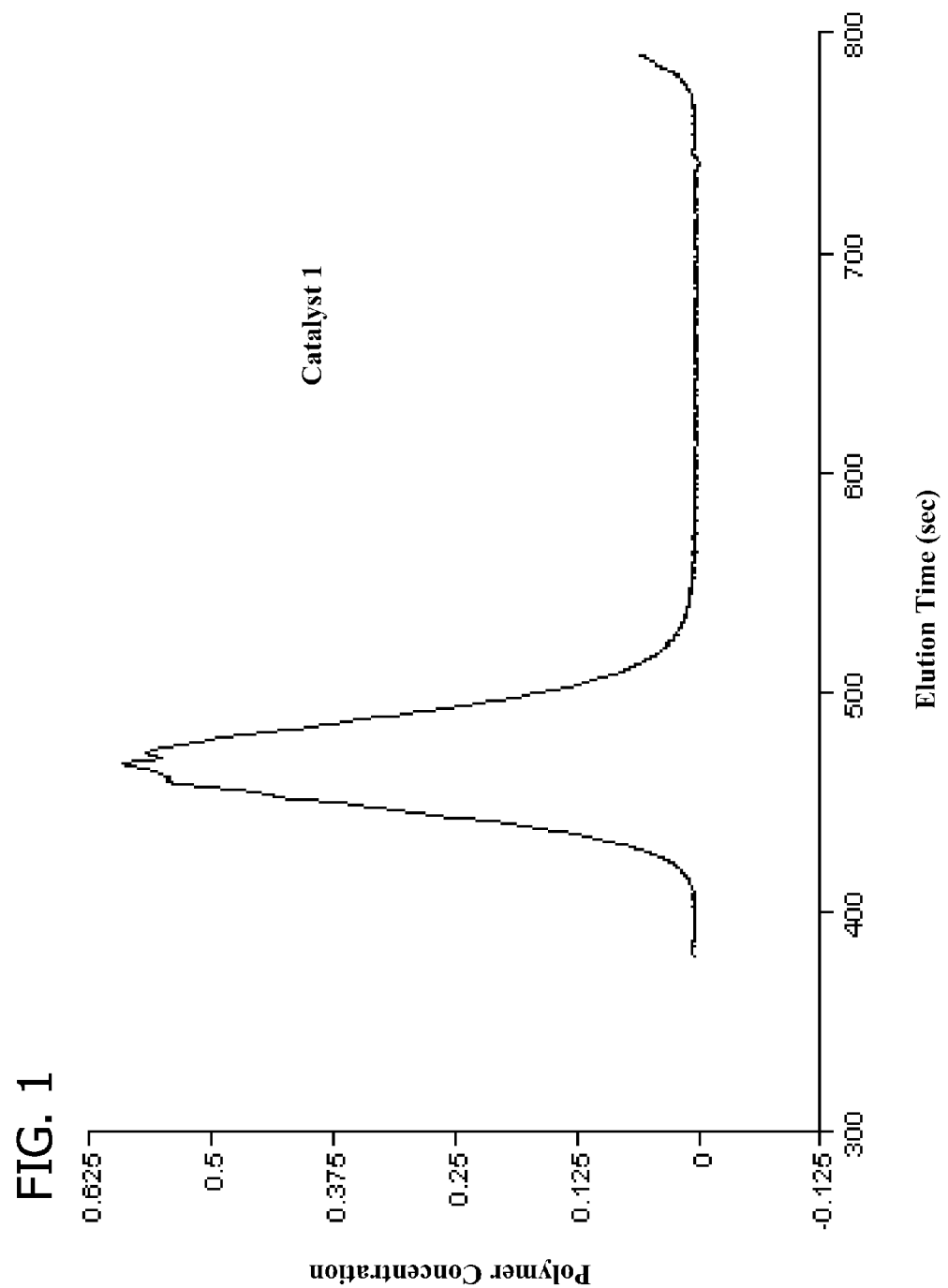
FIGS. 1-8 illustrate Rapid GPC chromatograms of polymer products prepared by use of four individual supported catalysts comprising a metal-ligand complex and four individual supported catalysts comprising co-supported two component metal-ligand complexes as described in Examples 1-4 herein below.

Embodiments of the present invention include provisions for slurry polymerization methods for producing very-high or ultra-high molecular weight polyethylene compositions using supported catalysts, the catalysts comprising a support, an activator, and one or more metal-ligand compositions or complexes, as well as the supported catalysts themselves. In some embodiments, the supported catalysts produce highly advantaged UHMWPE resins, including bimodal MWD UHMWPE from co-supporting two (or more) catalysts, potentially suitable for melt processing techniques. In some embodiments, catalysts with a single supported complex may produce narrow MWD UHMWPE resins potentially suitable for fiber applications. These catalysts may offer control of molecular weight, molecular weight distribution (MWD), comonomer incorporation & comonomer distribution as a function of molecular weight, which is not achievable with conventional Ziegler catalysts.

Applicants have found that compared to conventional Ziegler catalysts, so called "single-site" catalysts based on metallocene or "post-metallocene" catalysts (including the biphenylphenol-based catalysts described in WO 2005/108406 and WO 2003/091262, the entire contents of which are incorporated herein by reference for all relevant and consistent purposes), offer the advantages of narrow molecular weight distribution (MWD, a classic "single site" catalyst operating with statistical control of chain propagation & chain transfer is expected to give a polymer product with a MWD of 2, compared to MWD of around 4 to 8 or more, typical of Ziegler catalysts). Also, compared to conventional Ziegler catalysts, so called "single-site" catalysts based on metallocene or "post-metallocene" catalysts (including the biphenylphenol-based catalysts described in WO 2005/108406 and WO 2003/091262), offer the advantage of more uniform incorporation of α-olefin comonomers into ethylene/α-olefin copolymers, including more uniform incorporation of α-olefin comonomers as a function of molecular weight. Co-supported catalysts incorporating "single-site" catalysts based on metallocene or "post-metallocene" catalysts offer control of molecular weight, molecular weight distribution (MWD), comonomer incorporation & comonomer distribution as a function of molecular weight, which is not achievable with conventional Ziegler catalysts (see, for example, WO 02/090393 and WO 03/048213).

As used herein, the phrase "characterized by the formula" is not intended to be limiting and is used in the same way that "comprising" is commonly used. The term "independently selected" is used herein to indicate that the groups in question—e.g., $R^1$, $R^2$, $R^3$, $R^4$, and $R^5$—can be identical or different (e.g., $R^1$, $R^2$, $R^3$, $R^4$, and $R^5$ may all be substituted alkyls, or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. The terms "compound" and "complex" are generally used interchangeably in this specification, but those of skill in the art may recognize certain compounds as complexes and vice versa. For the purposes of illustration, representative certain groups are defined herein. These definitions are intended to supplement and illustrate, not preclude, the definitions known to those of skill in the art.

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 50 carbon atoms, such as methyl, ethyl, n-propyl, isopropyl, n-butyl, isobutyl, sec-butyl, t-butyl, octyl, decyl, and the like, as well as cycloalkyl groups such as cyclopentyl, cyclohexyl and the like. Generally, although again not necessarily, alkyl groups herein may contain 1 to about 20 carbon atoms. "Substituted alkyl" refers to alkyl substituted with one or more substituent groups (e.g., benzyl or chloromethyl), and the terms "heteroatom-containing alkyl" and "heteroalkyl" refer to alkyl in which at least one carbon atom is replaced with a heteroatom (e.g., —CH$_2$OCH$_3$ is an example of a heteroalkyl).

The term "alkenyl" as used herein refers to a branched or unbranched hydrocarbon group typically although not necessarily containing 2 to about 50 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 20 carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 50 carbon atoms and at least one triple bond, such as ethynyl, n-propynyl, isopropynyl, n-butynyl, isobutynyl, octynyl, decynyl, and the like. Generally, although again not necessarily, alkynyl groups herein may have 2 to about 20 carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "aromatic" is used in its usual sense, including unsaturation that is essentially delocalized across several bonds around a ring. The term "aryl" as used herein refers to a group containing an aromatic ring. Aryl groups herein include groups containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, or phenanthrenyl. In particular embodiments, aryl substituents include 1 to about 200 atoms other than hydrogen, typically 1 to about 50 atoms other than hydrogen, and specifically 1 to about 20 atoms other than hydrogen. In some embodiments herein, multi-ring moieties are substituents and in such embodiments the multi-ring moiety can be attached at an appropriate atom. For example, "naphthyl" can be 1-naphthyl or 2-naphthyl; "anthracenyl" can be 1-anthracenyl, 2-anthracenyl or 9-anthracenyl; and "phenanthrenyl" can be 1-phenanthrenyl, 2-phenanthrenyl, 3-phenanthrenyl, 4-phenanthrenyl or 9-phenanthrenyl.

The term "alkoxy" as used herein intends an alkyl group bound through a single, terminal ether linkage; that is, an "alkoxy" group may be represented as —O-alkyl where alkyl is as defined above. The term "aryloxy" is used in a similar fashion, and may be represented as —O-aryl, with aryl as defined below. The term "hydroxy" refers to —OH.

Similarly, the term "alkylthio" as used herein intends an alkyl group bound through a single, terminal thioether linkage; that is, an "alkylthio" group may be represented as —S-alkyl where alkyl is as defined above. The term "arylthio" is used similarly, and may be represented as —S-aryl, with aryl as defined below. The term "mercapto" refers to —SH.

The term "allenyl" is used herein in the conventional sense to refer to a molecular segment having the structure —CH=C=CH$_2$. An "allenyl" group may be unsubstituted or substituted with one or more non-hydrogen substituents.

The term "aryl" as used herein, and unless otherwise specified, refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In particular embodiments, aryl substituents have 1 to about 200 carbon atoms, typically 1 to about 50 carbon atoms, and specifically 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom (e.g., rings such as thiophene, pyridine, pyrazine, isoxazole, pyrazole, pyrrole, furan, thiazole, oxazole, imidazole, isothiazole, oxadiazole, triazole, etc. or benzo-fused analogues of these rings, such as indole, carbazole, benzofuran, benzothiophene, etc., are included in the term "heteroaryl"). In some embodiments herein, multi-ring moieties are substituents and in such an embodiment the multi-ring moiety can be attached at an appropriate atom. For example, "naphthyl" can be 1-naphthyl or 2-naphthyl; "anthracenyl" can be 1-anthracenyl, 2-anthracenyl or 9-anthracenyl; and "phenanthrenyl" can be 1-phenanthrenyl, 2-phenanthrenyl, 3-phenanthrenyl, 4-phenanthrenyl or 9-phenanthrenyl.

The terms "halo" and "halogen" are used in the conventional sense to refer to a chloro, bromo, fluoro or iodo substituent.

The terms "heterocycle" and "heterocyclic" refer to a cyclic radical, including ring-fused systems, including heteroaryl groups as defined below, in which one or more carbon atoms in a ring is replaced with a heteroatom—that is, an atom other than carbon, such as nitrogen, oxygen, sulfur, phosphorus, boron or silicon. Heterocycles and heterocyclic groups include saturated and unsaturated moieties, including heteroaryl groups as defined below. Specific examples of heterocycles include pyrrolidine, pyrroline, furan, tetrahydrofuran, thiophene, imidazole, oxazole, thiazole, indole, and the like, including any isomers of these. Additional heterocycles are described, for example, in Alan R. Katritzky, *Handbook of Heterocyclic Chemistry*, Pergammon Press, 1985, and in *Comprehensive Heterocyclic Chemistry*, A. R. Katritzky et al., eds, Elsevier, 2d. ed., 1996. The term "metallocycle" refers to a heterocycle in which one or more of the heteroatoms in the ring or rings is a metal.

The term "heteroaryl" refers to an aryl radical that includes one or more heteroatoms in the aromatic ring. Specific heteroaryl groups include groups containing heteroaromatic rings such as thiophene, pyridine, pyrazine, isoxazole, pyrazole, pyrrole, furan, thiazole, oxazole, imidazole, isothiazole, oxadiazole, triazole, and benzo-fused analogues of these rings, such as indole, carbazole, benzofuran, benzothiophene and the like.

More generally, the modifiers "hetero" and "heteroatom-containing", as in "heteroalkyl" or "heteroatom-containing hydrocarbyl group" refer to a molecule or molecular fragment in which one or more carbon atoms is replaced with a heteroatom. Thus, for example, the term "heteroalkyl" refers to an alkyl substituent that is heteroatom-containing. When the term "heteroatom-containing" introduces a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to hydrocarbyl radicals containing 1 to about 50 carbon atoms, specifically 1 to about 24 carbon atoms, most specifically 1 to about 16 carbon atoms, including branched or unbranched, saturated or unsaturated species, such as alkyl groups, alkenyl groups, aryl groups, and the like.

The term "lower hydrocarbyl" intends a hydrocarbyl group of one to six carbon atoms, specifically one to four carbon atoms.

By "substituted" as in "substituted hydrocarbyl," "substituted aryl," "substituted alkyl," and the like, as alluded to in some of the aforementioned definitions, is meant that in the hydrocarbyl, alkyl, aryl or other moiety, at least one hydrogen atom bound to a carbon atom is replaced with one or more substituent groups such as hydroxy, alkoxy, alkylthio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

The term "saturated" refers to the lack of double and triple bonds between atoms of a radical group such as ethyl, cyclohexyl, pyrrolidinyl, and the like. The term "unsaturated" refers to the presence of one or more double and triple bonds between atoms of a radical group such as vinyl, allyl, acetylide, oxazolinyl, cyclohexenyl, acetyl and the like, and specifically includes alkenyl and alkynyl groups, as well as groups in which double bonds are delocalized, as in aryl and heteroaryl groups as defined below.

By "divalent" as in "divalent hydrocarbyl", "divalent alkyl", "divalent aryl" and the like, is meant that the hydrocarbyl, alkyl, aryl or other moiety is bonded at two points to atoms, molecules or moieties with the two bonding points being covalent bonds.

As used herein the term "silyl" refers to the —$SiZ^1Z^2Z^3$ radical, where each of $Z^1$, $Z^2$, and $Z^3$ is independently selected from the group consisting of hydrogen and optionally substituted alkyl, alkenyl, alkynyl, heteroatom-containing alkyl, heteroatom-containing alkenyl, heteroatom-containing alkynyl, aryl, heteroaryl, alkoxy, aryloxy, amino, silyl and combinations thereof.

As used herein the term "boryl" refers to the —$BZ^1Z^2$ group, where each of $Z^1$ and $Z^2$ is as defined above. As used herein, the term "phosphino" refers to the group —$PZ^1Z^2$, where each of $Z^1$ and $Z^2$ is as defined above. As used herein, the term "phosphine" refers to the group: $PZ^1Z^2Z^3$, where each of $Z^1$, $Z^3$ and $Z^2$ is as defined above. The term "amino" is used herein to refer to the group —$NZ^1Z^2$, where each of $Z^1$ and $Z^2$ is as defined above. The term "amine" is used herein to refer to the group: $NZ^1Z^2Z^3$, where each of $Z^1$, $Z^2$ and $Z^3$ is as defined above.

Other abbreviations used herein include: "Pr" to refer to isopropyl; "Bu" to refer to tert-butyl; "Me" to refer to methyl; "Et" to refer to ethyl; "Ph" to refer to phenyl; "Mes" to refer to mesityl (2,4,6-trimethyl phenyl); "TFA" to refer to trifluoroacetate; "THF" to refer to tetrahydrofuran; "Np" refers to napthyl; "Cbz" refers to carbazolyl; "Ant" refers to anthracenyl; and "$H_8$-Ant" refers to 1,2,3,4,5,6,7,8-octahydroanthracenyl; "Bn" refers to benzyl; "Ac" refers to $CH_3CO$; "EA" refers to ethyl acetate; "Ts" refers to tosyl or, synonymously, para-toluenesulfonyl; "THP" refers to tetrahydropyran; "dppf" refers to 1,1'-bis(diphenylphosphino)ferrocenel; "MOM" refers to methoxymethyl.

"Polyethylene" means a polymer made 90% ethylene-derived units, or 95% ethylene-derived units, or 100% ethylene-derived units. The polyethylene can thus be a homopolymer or a copolymer, including a terpolymer, having other monomeric units. A polyethylene described herein can, for example, include at least one or more other olefins) and/or comonomer(s). The olefins, for example, can contain from 3 to 16 carbon atoms in one embodiment; from 3 to 12 carbon atoms in another embodiment; from 4 to 10 carbon atoms in another embodiment; and from 4 to 8 carbon atoms in yet another embodiment. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. Other embodiments may include ethacrylate or methacrylate.

"Ultra-high molecular weight polyethylene" refers to polyethylene compositions with weight-average molecular weight of at least about $3\times10^6$ g/mol. In some embodiments, the molecular weight of the ultra-high molecular weight polyethylene composition is between about $3\times10^6$ g/mol and about $20\times10^6$ g/mol, or about $3\times10^6$ g/mol and about $15\times10^6$ g/mol, or about $3\times10^6$ g/mol and about $10\times10^6$ g/mol, or about $3\times10^6$ g/mol and about $6\times10^6$ g/mol. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about $3\times10^6$ g/mol and more than about $1\times10^6$ g/mol. In some embodiments, the molecular weight of the very-high molecular weight polyethylene composition is between about $2\times10^6$ g/mol and less than about $3\times10^6$ g/mol.

The term "bimodal" refers to a polymer or polymer composition, e.g., polyethylene, having a "bimodal molecular weight distribution." A "bimodal" composition can include a polyethylene component with at least one identifiable higher molecular weight and a polyethylene component with at least one identifiable lower molecular weight, e.g., two distinct peaks on an SEC curve (GPC chromatogram). A material with more than two different molecular weight distribution peaks will be considered "bimodal" as that term is used although the material may also be referred to as a "multimodal" composition, e.g., a trimodal or even tetramodal, etc. composition.

The term "broad" as in "broad molecular weight distribution" includes the case where a polyethylene composition is comprised of a blend of higher and lower molecular weight components but where there are not two distinct peaks on an SEC curve (GPC chromatogram), but rather a single peak which is broader than the individual component peaks.

So called "single-site" catalysts based on metallocene or "post-metallocene" catalysts (including the biphenylphenol-based catalysts described in WO 2005/108406 and WO 2003/091262) are capable of producing narrow molecular weight distribution (MWD) polymer products. A classic "single site" catalyst operating with statistical control of chain propagation & chain transfer is expected to give a polymer product with a MWD of 2, compared to a "broad" MWD of around 4 to 8 or more typical of Ziegler catalysts, which are considered to be multi-site catalysts.

"Ultra-high molecular weight polyethylene component" refers to a polyethylene component in the bimodal composition with a weight average molecular weight of at least about $3\times10^6$ g/mol. In some embodiments, the ultra-high molecular weight polyethylene component has a weight average molecular weight between about $3\times10^6$ g/mol and about $20\times10^6$ g/mol, or between about $3\times10^6$ g/mol and about $15\times10^6$ g/mol, or between about $3\times10^6$ g/mol and about $10\times10^6$ g/mol, or between about $3\times10^6$ g/mol and about $6 \times 10^6$ g/mol. When the composition includes more than two components, e.g., a trimodal composition, the multimodal composition may have more than one ultra-high molecular weight component.

"Very-high molecular weight polyethylene component" refers to a polyethylene component in the bimodal (or multimodal) composition with a weight average molecular weight of less than about $3 \times 10^6$ g/mol (e.g., less than about $2.75 \times 10^6$ g/mol, about $2.5 \times 10^6$ g/mol, about $2.25 \times 10^6$ g/mol, or even about $2 \times 10^6$ g/mol) and more than about $1 \times 10^6$ g/mol (e.g., more than about $1.5 \times 10^6$ g/mol, or about $2 \times 10^6$ g/mol). "High-molecular weight polyethylene component" refers to a polyethylene component in the bimodal (or multimodal) composition with a weight average molecular weight of less than about $1 \times 10^6$ g/mol (e.g., less than about $7.5 \times 10^5$ g/mol, or even less than about $5 \times 10^5$ g/mol) and more than about $3 \times 10^5$ g/mol (e.g., more than $3.5 \times 10^5$ g/mol, or even more than $4 \times 10^5$ g/mol). When the composition includes more than two components, e.g., a trimodal composition, the multimodal composition may have more than one high molecular weight components, more than one very-high molecular weight components or at least one high molecular weight component and at least one very-high molecular weight component.

Ligands

The ligands disclosed herein, which may be suitable for use in a supported (or co-supported) catalyst of the present invention, can be described in a number of different ways. Thus, the ligands can be described as dianionic, chelating ligands that may occupy up to four coordination sites of a single metal atom. The ligands can also be described as diaionic ligands that, when chelated to a metal atom, form at least one or two seven member metalocycles (counting the metal atom as one member of the seven member ring). Alternatively, the ligands can be described as dianionic, chelating ligands that use either oxygen or sulfur as binding atoms to the metal atom. In still other alternatives, the ligands can be described as non-metallocene ligands that can coordinate in an approximate $C_2$-symmetrical complex with a metal atom. These descriptions are not mutually exclusive, and can be used together or separately.

For example, ligands suitable for use in the method of the invention may be characterized by the following general formula:

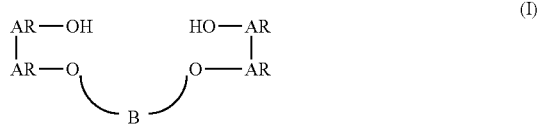

(I)

wherein each ligand has at least two hydrogen atoms capable of removal in a binding reaction with a metal atom or metal precursor or base; AR is an aromatic group that can be the same as or different from the other AR groups with, generally, each AR being independently selected from the group consisting of optionally substituted aryl or optionally substituted heteroaryl; and B is a bridging group having from 3 to 50 atoms (not counting hydrogen atoms). In one preferred embodiment, B is a bridge of between about 3 and about 20 carbon atoms (not including hydrogen atoms).

Generally, the "upper aromatic ring" is the ring to which the hydroxyls are bonded or part of. Similarly, the "lower aromatic ring" is the ring to which the oxygens are bonded or part of. In some embodiments, AR-AR (that is, the structure formed from one upper aromatic ring and its corresponding lower aromatic ring) is a biaryl species, more specifically a biphenyl.

In some embodiments, the bridging group B is selected from the group consisting of divalent hydrocarbyl and divalent heteroatom containing hydrocarbyl (including, for example, between about 3 and about 20 carbon atoms), which may be optionally substituted. In more particular embodiments, B is selected from the group consisting of optionally substituted divalent alkyl, alkenyl, alkynyl, heteroalkyl, heteroalkenyl, heteroalkynyl, aryl, heteroaryl and silyl. In any of these embodiments, the bridging group can be substituted with one or more optionally substituted hydrocarbyl or optionally substituted heteroatom-containing hydrocarbyl groups, such as optionally substituted alkyl, alkenyl, alkynyl, heteroalkyl, heteroalkenyl, heteroalkynyl, aryl, or heteroaryl. It should be noted that these substitutions are in addition to the bonds between the bridging group B and the oxygen atoms in formula I. Two or more of the hydrocarbyl or heteroatom-containing hydrocarbyl groups can be joined into a ring structure having from 3 to 50 atoms in the ring structure (not counting hydrogen atoms). In some embodiments in which the bridging group includes one or more ring structures, it may be possible to identify more than one chain of bridge atoms extending from the oxygen atoms, and in such cases it can be convenient to define the "bridge" as the shortest path of connectivity between the oxygen atoms, and the "substituents" as the groups bonded to atoms in the bridge. Where there are two alternative, equally short paths of connectivity, the bridge can be defined along either path.

In still other embodiments, B can be represented by the general formula -(Q''R$^{40}_{2-z''}$)$_{z'}$— wherein each Q'' is independently either carbon or silicon and where each R$^{40}$ is independently selected from the group consisting of hydrogen and optionally substituted hydrocarbyl or optionally substituted heteroatom-containing hydrocarbyl. Two or more R$^{40}$ groups may be joined into a ring structure having from 3 to 50 atoms in the ring structure (not counting hydrogen atoms). In these embodiments, z' is an integer from 1 to 10, more specifically from 1 to 5 and even more specifically from 2-5, and z'' is 0, 1 or 2. For example, when z'' is 2, there is no R$^{40}$ group associated with Q'', which allows for those cases where one Q'' is multiply bonded to a second Q''. In more specific embodiments, R$^{40}$ is selected from the group consisting of hydrogen, halogen, and optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, alkylthio, arylthio, and combinations thereof, where at least one R$^{40}$ group in B is not hydrogen. In any of the embodiments mentioned above, the B group can include one or more chiral centers. Thus, for example, B can be represented by the formula —CHR$^{50}$—(CH$_2$)$_m$—CHR$^{51}$—, where R$^{50}$ and R$^{51}$ are independently selected from the group consisting of optionally substituted alkyl, heteroalkyl, aryl or heteroaryl, R$^{50}$ and R$^{51}$ can be arranged in any relative configuration (e.g., syn/anti, threo/erythro, or the like), and where the ligand can be generated as a racemic mixture or in an enantiomerically pure form.

In particular embodiments, the bridging group B includes a chain of one or more bridge atoms extending from the oxygen atoms and one or more of the bridge atoms situated adjacent to one or both of the oxygen atoms is bonded to one or more substituents (not counting bonds to one or both of the oxygen atoms or neighboring bridge atoms along the chain, as noted above), where the substituents are independently selected from the group consisting of optionally substituted alkyl, heteroalkyl, aryl and heteroaryl. In more particular embodiments, the bridging group B is substituted with a plurality of substituents that are independently selected from the group consisting of optionally substituted alkyl, heteroalkyl, aryl and heteroaryl, such that each of the bridge atoms that is adjacent to one or both of the oxygen atoms is bonded to at least one substituent, again not counting bonds to the oxygen atoms or neighboring bridge atoms. In such embodiments, two or more of the substituents can be joined into a ring structure having from 3 to 50 atoms in the ring structure (not counting hydrogen atoms).

Thus, in some embodiments, the O—B—O fragment can be characterized by one of the following formulae:

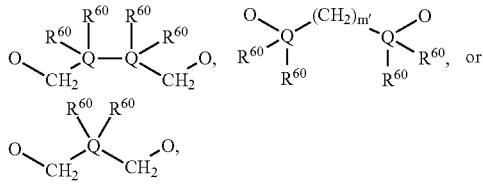

where each Q is independently selected from the group consisting of carbon and silicon, each $R^{60}$ is independently selected from the group consisting of hydrogen and optionally substituted hydrocarbyl and heteroatom containing hydrocarbyl, provided that at least one $R^{60}$ substituent is not hydrogen, wherein the $R^{60}$ substituents are optionally joined into a ring structure having from 3 to 50 atoms in the ring structure not counting hydrogen atoms, and m' is 0, 1, 2 or 3. Specific O—B—O fragments within these embodiments include, for example, O—$(CH_2)_3$—O, O—$(CH_2)_4$—O, O—$CH(CH_3)$—$CH(CH_3)$—O, O—$CH_2$—$CH(CH_3)$—$CH_2$—O, O—$CH_2$—$C(CH_3)_2$—$CH_2$—O, O—$CH_2$—CH($CHMe_2$)—$CH_2$—O', O—$CH_2$—$CH(C_6H_5)$—$CH_2$—O, O—$CH(CH_3)$—$CH_2$—$CH(CH_3)$—O, O—$CH(C_2H_5)$—$CH_2$—$CH(C_2H_5)$—O, O—$CH(CH_3)CH_2CH_2CH(CH_3)$—O, O—$CH(C_6H_5)CH_2CH(C_6H_5)$—O,

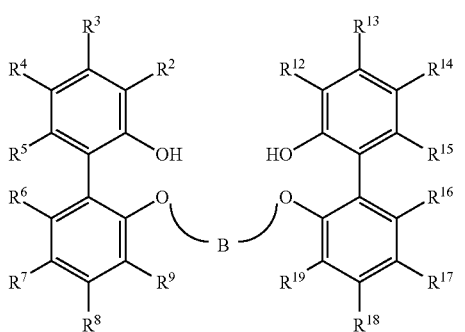

Other specific bridging moieties are set forth in the example ligands and complexes herein.

In particular embodiments, the ligands can be characterized by the general formula:

(II)

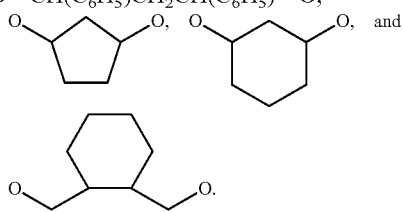

wherein each of $R^2$, $R^3$, $R^4$, $R^5$, $R^6$, $R^7$, $R^8$, $R^9$, $R^{12}$, $R^{13}$, $R^{14}$, $R^{15}$, $R^{16}$, $R^{17}$, $R^{18}$, and $R^{19}$ is independently selected from the group consisting of hydrogen, halogen, and optionally substituted hydrocarbyl, heteroatom-containing hydrocarbyl, alkoxy, aryloxy, silyl, boryl, phosphino, amino, alkylthio, arylthio, nitro, and combinations thereof; optionally two or more R groups can combine together into ring structures (for example, single ring or multiple ring structures), with such ring structures having from 3 to 12 atoms in the ring (not counting hydrogen atoms); and B is a bridging group as defined above.

In more specific embodiments, each of $R^2$, $R^3$, $R^4$, $R^5$, $R^6$, $R^7$, $R^8$, $R^9$, $R^{12}$, $R^{13}$, $R^{14}$, $R^{15}$, $R^{16}$, $R^{17}$, $R^{18}$, and $R^{19}$ is independently selected from the group consisting of hydrogen, halogen, and optionally substituted alkyl, heteroalkyl, aryl, heteroaryl, alkoxyl, aryloxyl, silyl, amino, alkylthio and arylthio. In some embodiments, at least one of $R^2$ and $R^{12}$ is not hydrogen and in still other embodiments both $R^2$ and $R^{12}$ are not hydrogen.

In more specific embodiments, $R^2$ and $R^{12}$ are selected from the group consisting of an aryl and a heteroaryl (e.g., phenyl, substituted phenyl, antrazenyl carbozyl, mesityl, 3,5-(t-Bu)$_2$-phenyl and the like); $R^3$, $R^4$, $R^5$, $R^6$, $R^7$, $R^8$, $R^9$, $R^{13}$, $R^{14}$, $R^{15}$, $R^{16}$, $R^{17}$, $R^{18}$, and $R^{19}$ are defined as above; and B is:

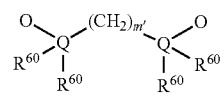

wherein Q, $R^{60}$ and m' are as defined above.

In another specific embodiment, $R^2$ and $R^{12}$ are independently selected from the group consisting of substituted or unsubstituted moieties of the general formulae:

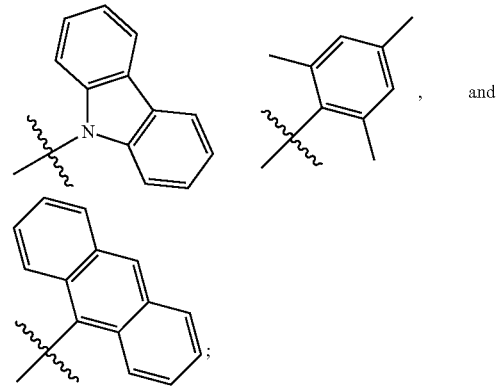

wherein the denoted broken bonds are points of attachment to the remaining portion of the molecule; $R^4$ and $R^{14}$ are each an alkyl; $R^3$, $R^5$, $R^6$, $R^7$, $R^8$, $R^9$, $R^{13}$, $R^{15}$, $R^{16}$, $R^{17}$, $R^{18}$, and $R^{19}$ are hydrogen, and B is selected from the group consisting of:

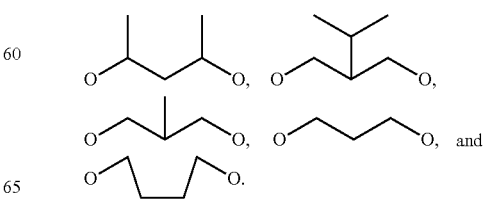

The illustrated structures are provided for purposes of illustration and should not be viewed in a limiting sense. For example, one or more of the rings may be substituted with one of more substituents selected from, for example, Me, iPr, Ph, Bn, tBu, and the like.

While the moiety of the following formula includes three methyl substituents,

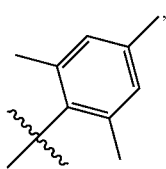

it should be known that one or more of the methyl groups may be replaced by a hydrogen or some other suitable substituent (e.g., lower alkyl, such as methyl, ethyl, etc.), and/or may be positioned elsewhere on the ring without departing from the intended scope of the present invention.

In more specific embodiments, the ligands can be characterized by the formula:

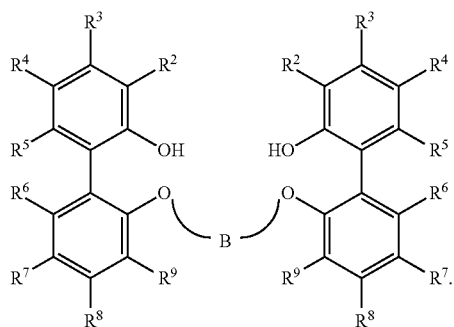

(III)

In formula III, each of $R^2$, $R^3$, $R^4$, $R^5$, $R^6$, $R^7$, $R^8$ and $R^9$ independently selected from the group consisting of hydrogen, halogen, and optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, mercapto, alkylthio and arylthio, nitro, and combinations thereof. The remaining substituent B is defined as above.

In more specific embodiments, $R^2$ is selected from the group consisting of an aryl and a heteroaryl; $R^4$ is alkyl; $R^3$, $R^5$, $R^6$, $R^7$, $R^8$ and $R^9$ are hydrogen; and B is:

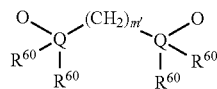

wherein Q, $R^{60}$, and m' are as defined above.

In another particular embodiment, $R^2$ is selected from the group consisting of substituted or unsubstituted moieties of the general formulae:

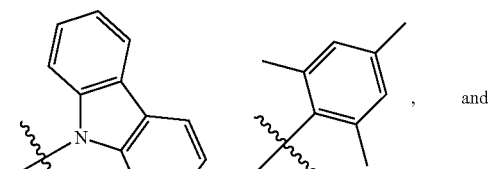

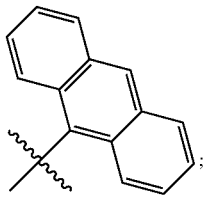

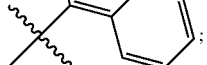

$R^4$ is an alkyl; $R^3$, $R^5$, $R^6$, $R^7$, $R^8$ and $R^9$ are defined as above; and B is selected from the group consisting of:

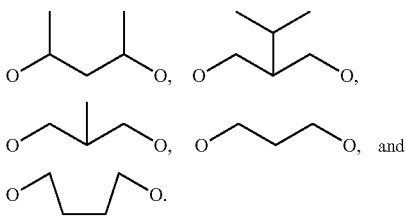

In one embodiment, ligands are selected from the group consisting of the structures illustrated in Table 1, below:

TABLE 1

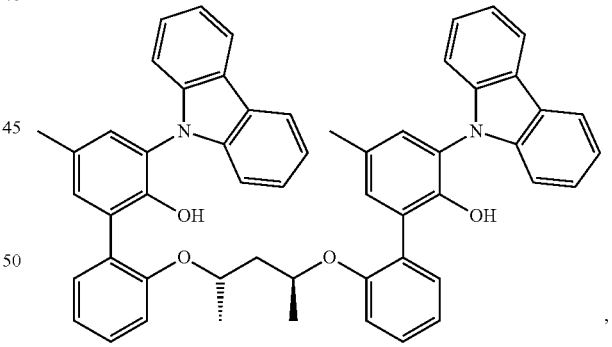

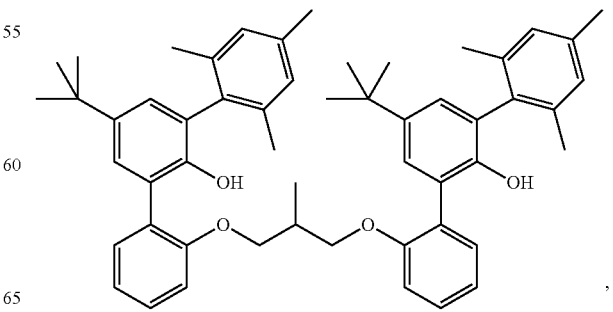

TABLE 1-continued

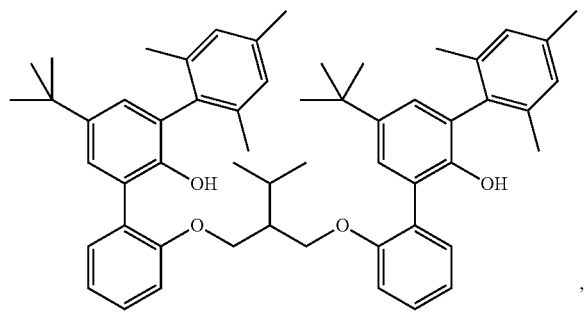 [SMILES: Cc1cc(C)c(-c2cc(C(C)(C)C)cc(-c3ccccc3OCC(COc3ccccc3-c3cc(C(C)(C)C)cc(-c4c(C)cc(C)cc4C)c3O)C(C)C)c2O)c(C)c1]

,

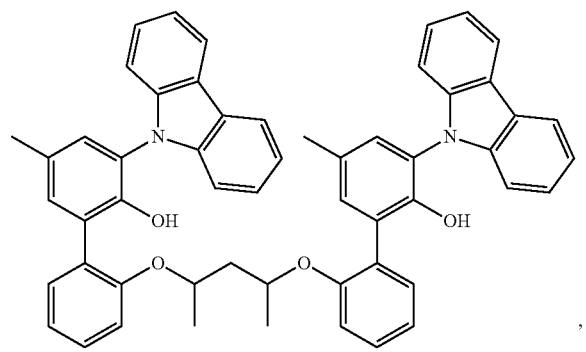 [SMILES: Cc1cc(-c2ccccc2OC(C)CC(C)Oc2ccccc2-c2cc(C)cc(-n3c4ccccc4c4ccccc43)c2O)c(O)c(-n2c3ccccc3c3ccccc32)c1]

,

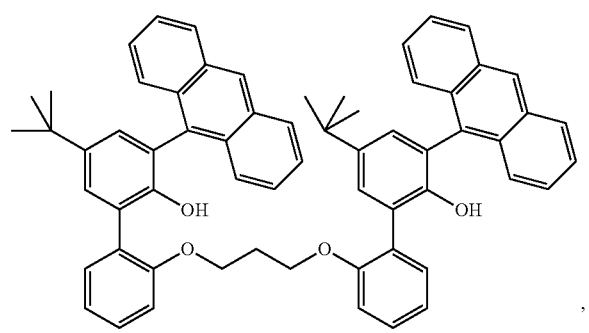 [SMILES: CC(C)(C)c1cc(-c2ccccc2OCCCOc2ccccc2-c2cc(C(C)(C)C)cc(-c3c4ccccc4cc4ccccc34)c2O)c(O)c(-c2c3ccccc3cc3ccccc23)c1]

,

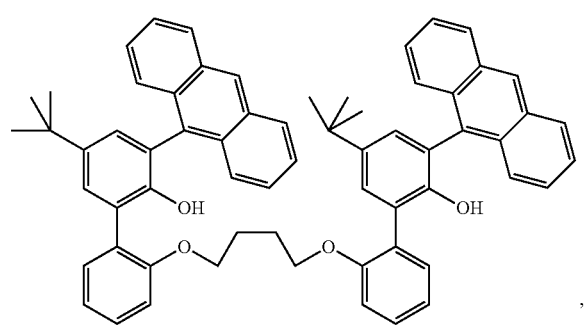 [SMILES: CC(C)(C)c1cc(-c2ccccc2OCCCCOc2ccccc2-c2cc(C(C)(C)C)cc(-c3c4ccccc4cc4ccccc34)c2O)c(O)c(-c2c3ccccc3cc3ccccc23)c1]

,

TABLE 1-continued and

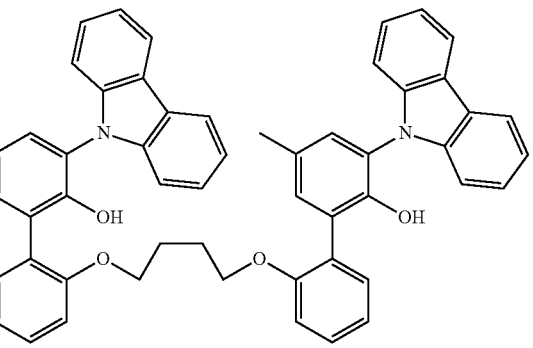

The choice of particular R and B groups can have a strong influence on the polymerization of olefins. Thus, the choice of substituent can affect catalyst activity, thermal stability, the molecular weight of the product polymer, the degree and/or kind of stereo- or regioerrors, as well as other factors known to be significant in the production of various polymers.

In some embodiments, substituents can be selected to affect solubility of the resulting ligand, complex or catalyst. For example, in some such embodiments $R^4$ and/or $R^{14}$ can be selected from alkyl groups having 4 or more carbons, 6 or more carbons, or 10 or more carbons.

Certain of these ligands are preferred for the polymerization of certain monomers in a catalytic composition and/or in a metal complex. These certain embodiments are discussed further below.

Ligand Preparation

Generally speaking, in one or more embodiments, the ligands disclosed herein, which may be suitable for use in a supported (or co-supported) catalyst of the invention, can be prepared using known procedures, such as those described, for example, in March, Advanced Organic Chemistry, Wiley, New York 1992 ($4^{th}$ Ed.). More specifically, the ligands of the invention can be prepared using a variety of synthetic routes, depending on the variation desired in the ligand. In general, the ligands are prepared in a convergent approach by preparing building blocks that are then linked together either directly or with a bridging group. Variations in the R group substituents can be introduced in the synthesis of the building blocks. Variations in the bridge can be introduced with the synthesis of the bridging group. The preparation of suitable ligands has also been described in detail in, for example, WO 03/091262, WO 2005/0084106, U.S. Pat. No. 7,060,848, U.S. Pat. No. 7,091,292, U.S. Pat. No. 7,126,031, U.S. Pat. No. 7,241,714, U.S. Pat. No. 7,241,715, and U.S. Patent Publication No. 2008/0269470; the entire contents of which are incorporated herein by reference for all relevant and consistent purposes.

Metal Precursor Compounds

Once the desired ligand is formed, it may be combined with a metal atom, ion, compound or other metal precursor compound. For example, in some embodiments, the metal precursors are activated metal precursors, which refers to a metal precursor (described below) that has been combined or reacted with an activator (described below) prior to combination or reaction with the ancillary ligand. As noted above, in one aspect the invention relates to compositions that include such combinations of ligand and metal atom, ion, compound or precursor. In some applications, the ligands are combined with a metal compound or precursor and the product of such combination is not determined, if a product forms. For example, the ligand may be added to a reaction vessel at the same time as the metal or metal precursor compound along with the reactants, activators, scavengers, etc. Additionally, the ligand can be modified prior to addition to or after the addition of the metal precursor, e.g. through a deprotonation reaction or some other modification.

In general, the metal precursor compounds may be characterized by the general formula $M(L)_n$ where M is a metal selected from the group consisting of groups 3-6 and lanthanide elements of the periodic table of elements, more specifically, from group 4, and even more specifically is selected from Hf and Zr. Each L is a ligand independently selected from the group consisting of hydrogen, halogen, optionally substituted alkyl, heteroalkyl, allyl, diene, alkenyl, heteroalkenyl, alkynyl, heteroalkynyl, aryl, heteroaryl, alkoxy, aryloxy, boryl, silyl, amino, phosphino, ether, thioether, phosphine, amine, carboxylate, alkylthio, arylthio, 1,3-dionate, oxalate, carbonate, nitrate, sulfate, and combinations thereof. Optionally, two or more L groups are joined into a ring structure. One or more of the ligands L may also be ionically bonded to the metal M and, for example, L may be a non-coordinated or loosely coordinated or weakly coordinated anion (e.g., L may be selected from the group consisting of those anions described below in the conjunction with the activators); and optionally two or more L groups may be linked together in a ring structure. (See, e.g., Marks et al., Chem. Rev. 2000, 100, 1391-1434 for a detailed discussion of these weak interactions.) The subscript n is 1, 2, 3, 4, 5, or 6. The metal precursors may be monomeric, dimeric or higher orders thereof.

Specific examples of suitable hafnium and zirconium precursors include, but are not limited: $HfCl_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, $Hf(N(SiMe_3)_2)_2Cl_2$, $Hf(N(SiMe_3)CH_2CH_2CH_2N(SiMe_3))Cl_2$, and, $Hf(N(Ph)CH_2CH_2CH_2N(Ph))Cl_2$, as well as $ZrCl_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $Zr(N(SiMe_3)CH_2ZrCH_2CH_2N(SiMe_3))Cl_2$, and $Zr(N(Ph)CH_2CH_2CH_2N(Ph))Cl_2$. Lewis base adducts of these examples are also suitable as metal precursors, for example, ethers, amines, thioethers, phosphines and the like are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $[M(CH_2Ph)_3^+][B(C_6F_5)_4^-]$ or $[M(CH_2Ph)_3^+][PhCH_2B(C_6F_5)_3^-]$ where M is Zr or Hf Activated metal precursors or such ionic compounds can be prepared in the manner shown in Pellecchia et al., Organometallics, 1994, 13, 298-302; Pellecchia et al., J. Am. Chem. Soc., 1993, 115, 1160-1162; Pellecchia et al., Organometallics, 1993, 13, 3773-3775 and Bochmann et al., Organometallics, 1993, 12, 633-640, each of which is incorporated herein by reference.

The ligand to metal precursor compound ratio is typically in the range of about 0.1:1 to about 10:1, or about 0.5:1 to about 5:1, or about 0.75:1 to about 2.5:1, and more specifically about 1:1.

As also noted above, in another aspect the invention relates to metal-ligand complexes. Generally, the ligand (or optionally a modified ligand as discussed above) is mixed with a suitable metal precursor (and optionally other components, such as activators) prior to or simultaneously with allowing the mixture to be contacted with the reactants (e.g., monomers). When the ligand is mixed with the metal precursor compound, a metal-ligand complex may be formed, which may be supported with an appropriate activator to form a supported catalyst (or co-supported catalyst) suitable for use in accordance with the present invention.

Metal-Ligand Complexes

The metal-ligand complexes according to the invention, which may be supported with an activator to form a catalyst of the present invention, can in general be described in a number of overlapping or alternative ways. Thus, the metal-ligand complexes can be described as complexes having dianionic, chelating ligands that may occupy up to four coordination sites of the metal atom. The metal-ligand complexes can also be described as having dianionic ligands that form two seven-member metallocycles with the metal atom (counting the metal atom as one member of the seven member ring). Also, in some embodiments, the metal-ligand complexes can be described as having dianionic, chelating ligands that use oxygen as binding atoms to the metal atom.

Also, in some embodiments, the metal-ligand complexes can be described as having ligands that can coordinate in at least two approximate $C_2$ symmetric complex isomers. By approximate $C_2$ symmetry it is meant that the ligand coordinates with a metal such that the ligand parts occupy four quadrants around the metal center extending towards the ligands L in an approximate $C_2$ symmetric fashion, and approximate means that true symmetry may not exist due to several factors that effect symmetry, including, for example, the effect of the bridge. In these embodiments, the conformation of the ligand around the metal can be described as lambda or delta. At least two isomeric complexes can be formed which may be enantiomeric or diastereomeric to each other. For ligands containing one or more chiral centers (e.g., substituted bridges with chiral centers), diastereomeric metal-ligand complexes can be formed. The diastereomeric complexes formed by a particular ligand-metal precursor combination can be used as mixtures of diastereomers, or can be separated and used as diastereomerically-pure complexes.

These isomeric structures may be separately formed by employing suitable metal precursors containing appropriately substituted ligands (such as chelating bis-amide, bis-phenol, or diene ligands, as described below), which may strongly influence the stereochemistry of complexation reactions. It is known that group 4 metal complexes containing chelating ligands can be used as metal precursors in complexation reactions with the bridged bis-cyclopentadienyl ligands to control the stereochemistry of the resulting bridged metallocene complex, as is described in Zhang et al., J. Am. Chem. Soc., 2000; 122, 8093-8094, LoCoco et al., Organometallics, 2003, 22, 5498-5503, and Chen et al., J. Am. Chem. Soc., 2004, 126, 42-43. The use of analogous Group 4 metal precursors containing appropriately substituted chelating ligands in complexation reactions with the bridged bis(biaryl) ligands described herein may provide a mechanism to influence the stereochemistry of the resulting chiral approximately C$_2$-symmetric metal-ligand complexes. The use of analogous chiral Group 4 metal precursors containing appropriately substituted chelating ligands that possess one or more chiral centers may provide a mechanism to influence the absolute stereochemistry of the resulting chiral approximately C$_2$-symmetric metal-ligand complexes. The use of substantially enantiomerically pure chiral Group 4 metal precursors containing appropriately substituted chelating ligands that possess one or more chiral centers may provide a mechanism to prepare substantially enantiomerically or diastereomerically pure approximately C$_2$-symmetric metal-ligand complexes of this invention.

In some cases, it may also be possible to separate mixtures of enantiomers or diastereomers by means of diastereomeric/enantiomeric resolution using a chiral reagent. See, for example, Ringwald et al., *J. Am. Chem. Soc.*, 1999, 121, pp. 1524-1527.

The various diastereomeric complexes may have different polymerization performance when used as catalysts for polymerizations, resulting, for example, in the formation of polymer products having bimodal molecular weight and/or composition distribution.

In some embodiments, metal-ligand complexes according to an aspect of the invention can be characterized by the general formula:

(4,2,O,S)ML$_{n'}$                                (IV)

where (4,2,O,S) is a dianionic ligand having at least 4 atoms that are each independently oxygen or sulfur and chelating to the metal M at 4 coordination sites through oxygen and/or sulfur atoms with two of the bonds between the oxygen or sulfur atoms and the metal being covalent in nature and two of the bonds being dative in nature (i.e., oxygen or sulfur atoms acting as Lewis bases and the metal center acting as a Lewis acid); M is a metal selected from the group consisting of groups 3-6 and lanthanide elements of the periodic table of elements, more specifically, from group 4 (e.g., Hf or Zr); each L is independently selected from the group consisting of hydrogen, halogen, optionally substituted alkyl, heteroalkyl, allyl, diene, alkenyl, heteroalkenyl, alkynyl, heteroalkynyl, aryl, heteroaryl, alkoxy, aryloxy, boryl, silyl, amino, phosphino, ether, thioether, phosphine, amine, carboxylate, alkylthio, arylthio, 1,3-dionate, oxalate, carbonate, nitrate, sulfate, and combinations thereof; and optionally two or more L groups may be linked together in a ring structure; n' is 1, 2, 3, or 4.

In other embodiments, metal-ligand complexes according to the invention comprise two seven-member metallocycles formed with bonds from the metal atom to at least 2 heteroatoms (e.g., O, S, N, P and the like). In more specific forms, these metal-ligand complexes comprise two seven-member metallocycles and even more specifically, there are at least two seven-member metallocycles that are joined together by at least one bridging group. In still other embodiments, two, bridged seven-member metallocycles form a symmetrical complex, as shown in the examples below:

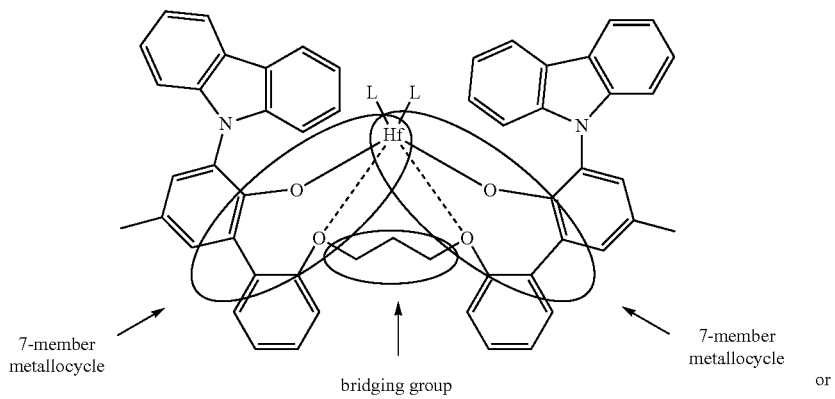

or

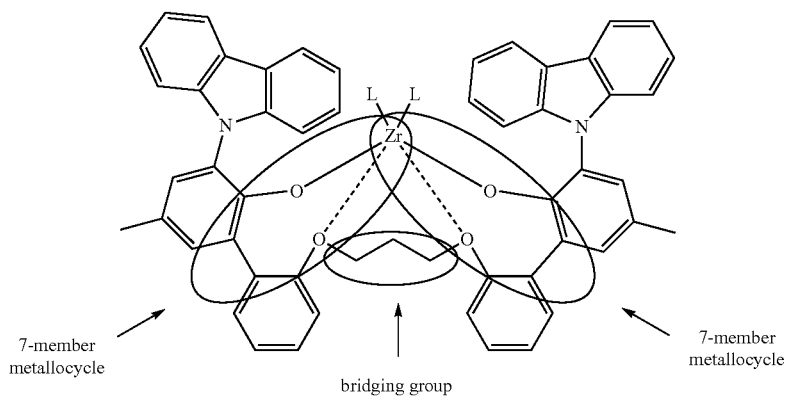

where the complex includes two metallocycles bound by a single bridging group.

In still other embodiments, metal-ligand complexes according to the invention may be characterized by the general formula:

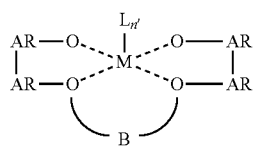

(V)

wherein each of AR, M, L, B, and n', are as defined above; and the dotted lines indicate possible binding to the metal atom, provided that at least two of the dotted lines are covalent bonds.

In this regard it is to be noted that $L_{n'}$ indicates that the metal M is bonded to a number n' groups of L, as defined above.

It is to be further noted that, in one preferred embodiment, B is a bridge of between about 3 and about 50 carbon atoms (not including hydrogen atoms), and more preferably is a bridge of between about 3 and about 20 carbon atoms.

In still other embodiments, metal-ligand complexes according to the invention can be characterized by the general formula:

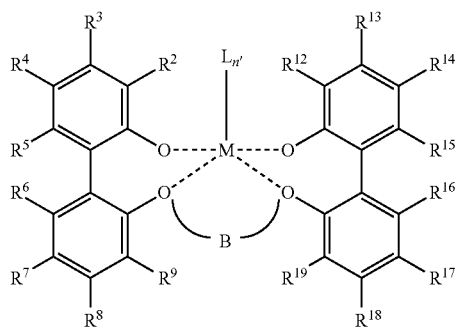

(VI)

wherein each of $R^2$, $R^3$, $R^4$, $R^5$, $R^6$, $R^7$, $R^8$, $R^9$, $R^{12}$, $R^{13}$, $R^{14}$, $R^{15}$, $R^{16}$, $R^{17}$, $R^{18}$, and $R^{19}$ defined above for structure (II), and M, L, n', B, are as defined above and as further explained in connection with structure (V). The dotted lines indicate possible binding to the metal atom, provided that at least two of the dotted lines are covalent bonds.

In more specific embodiments, $R^2$ and $R^{12}$ are selected from the group consisting of an aryl and a heteroaryl; $R^2$, $R^3$, $R^4$, $R^5$, $R^6$, $R^7$, $R^8$, $R^9$, $R^{13}$, $R^{14}$, $R^{15}$, $R^{16}$, $R^{17}$, $R^{18}$ and $R^{19}$ are defined as above; and B is:

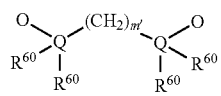

In another particular embodiment, $R^2$ and $R^{12}$ are independently selected from the group consisting of substituted or unsubstituted moieties of the general formulae:

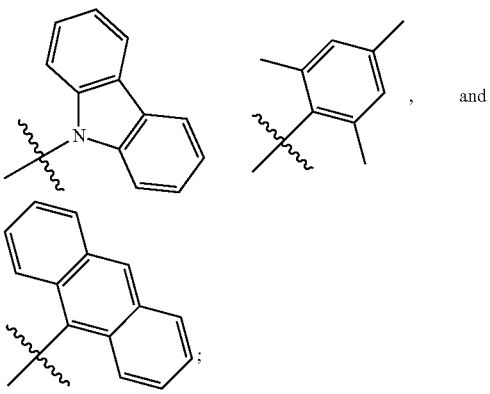

$R^4$ and $R^{14}$ are each an alkyl; $R^3$, $R^5$, $R^6$, $R^7$, $R^8$, $R^9$, $R^{13}$, $R^{15}$, $R^{16}$, $R^{17}$, $R^{18}$ are hydrogen, and B is selected from the group consisting of:

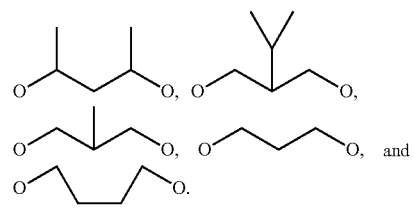

In more specific embodiments, the metal-ligand complexes of this invention may be characterized by the general formula:

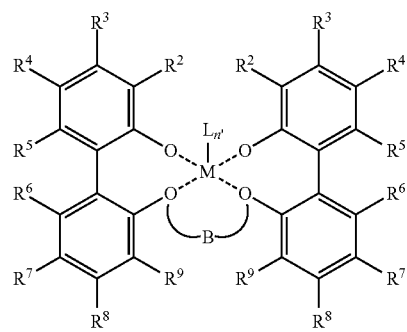

(VII)

wherein $R^2$, $R^3$, $R^4$, $R^5$, $R^6$, $R^7$, $R^8$, $R^9$, M, L, n', and B are as defined above and as further explained in connection with structure V. The dotted lines indicate possible binding to the metal atom, provided that at least two of the dotted lines are covalent bonds.

In another particular embodiment, $R^2$ is selected from the group consisting of an aryl and a heteroaryl; $R^4$ is an alkyl; $R^3$, $R^5$, $R^6$, $R^7$, $R^8$, $R^9$ are hydrogen; and B is:

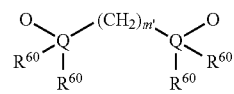

wherein Q, $R^{60}$, and m' are as defined above.

In another particular embodiment, $R^2$ is selected from the group consisting of substituted or unsubstituted moieties of the general formulae:

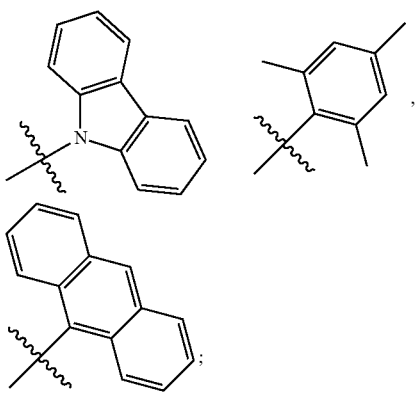

wherein $R^4$ is an alkyl; and $R^3$, $R^5$, $R^6$, $R^7$, $R^8$ and $R^9$ are defined as above, and B is selected from the group consisting of:

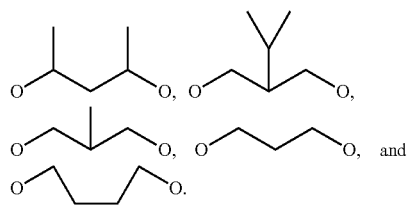

In some embodiments, M is selected from the group consisting of Hf and Zr.

In addition, Lewis base adducts of the metal-ligand complexes in the above formulas may be suitable, for example, ethers, amines, thioethers, phosphines and the like are suitable as Lewis bases.

Specific metal-ligand complexes within the scope of the invention include Group 4 metal complexes formed from any of the ligands set out in Table 1, above.

In one embodiment, the metal-ligand complexes are selected from the group consisting of:

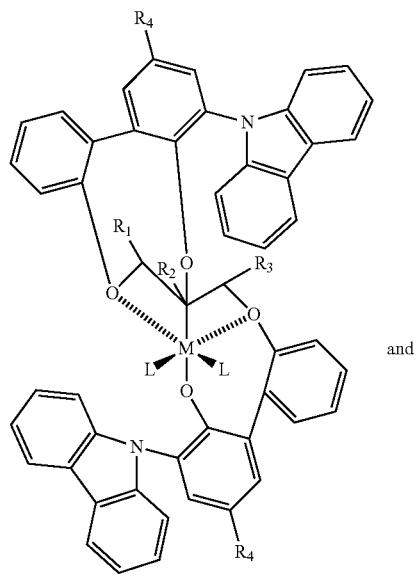

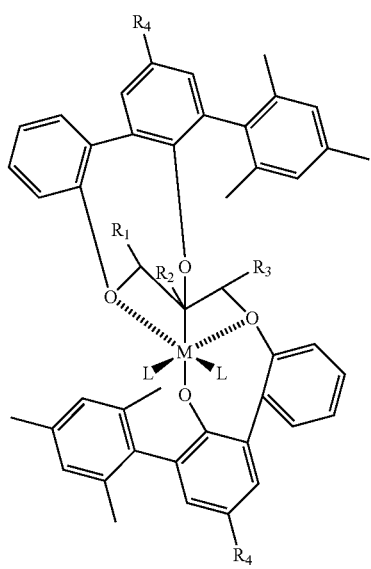

wherein L is selected from the group consisting of Cl, Br, Bn, $NMe_2$, $NEt_2$ and $N(SiMe_3)_2$; $R_1$, $R_2$, $R_3$ and $R_4$ are each hydrogen or an alkyl; and M is selected from the group consisting of Zr and Hf. In another embodiment, the metal-ligand complex is selected from the group consisting of:

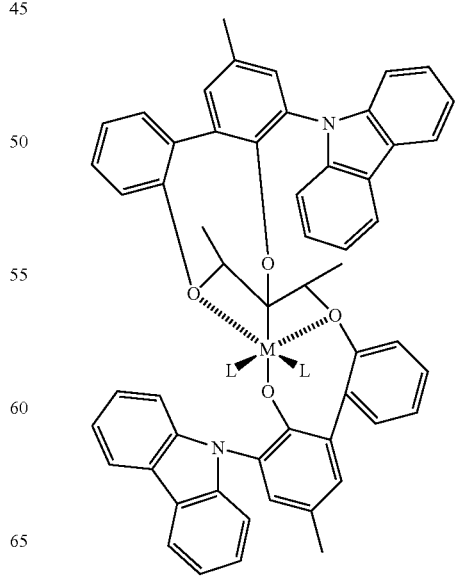

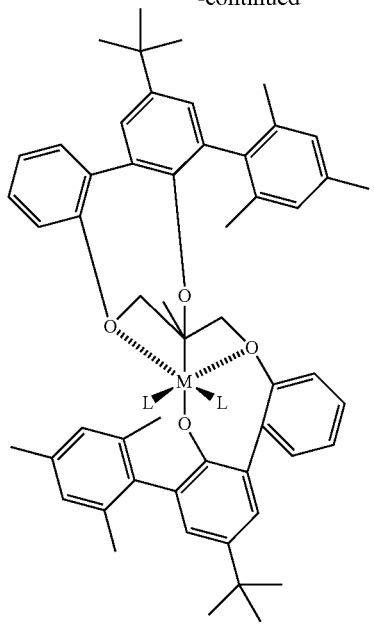
, and
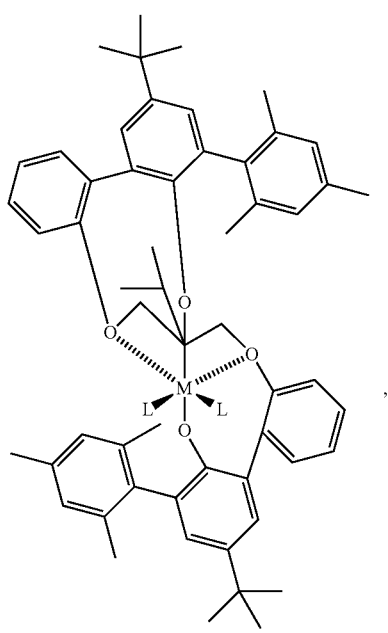
,
wherein L is selected from the group consisting of Cl, Br, Bn, NMe$_2$, NEt$_2$ and N(SiMe$_3$)$_2$, and M is selected from the group consisting of Zr and Hf.
In a particular embodiment, the metal-ligand complex is selected from the group consisting of:
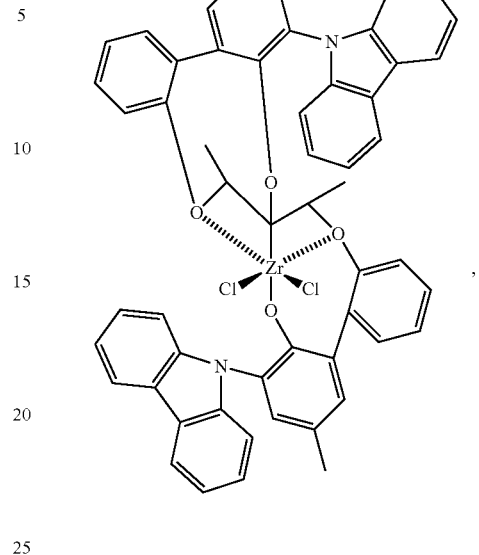
,
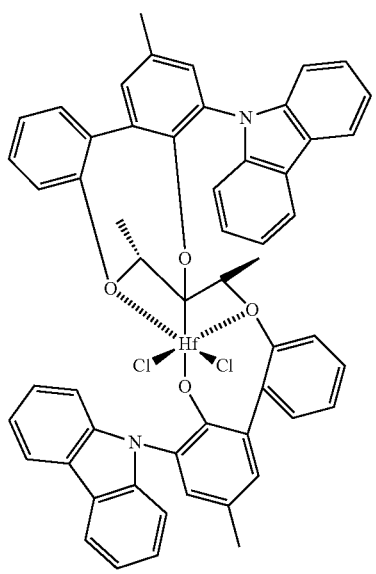

-continued

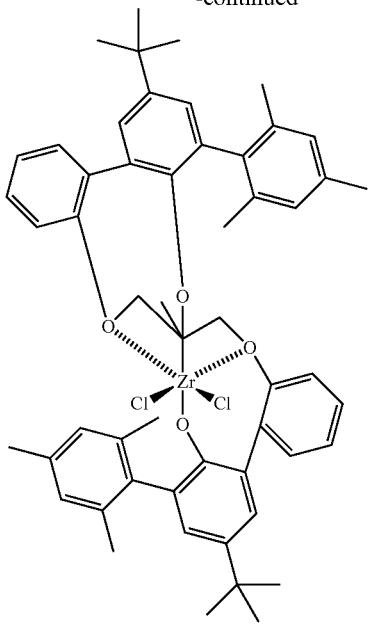

, and

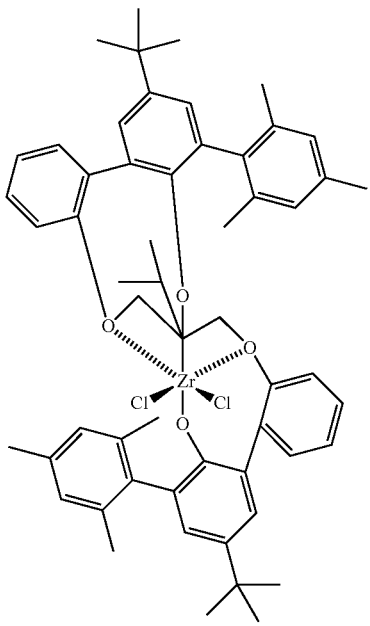

Metal-Ligand Complex Preparation

The metal-ligand complexes can be formed by techniques known to those of skill in the art, such as combinations of metal precursors and ligands under conditions to afford complexation. For example, the complexes of this invention can be prepared according to the general scheme shown below:

Scheme 13

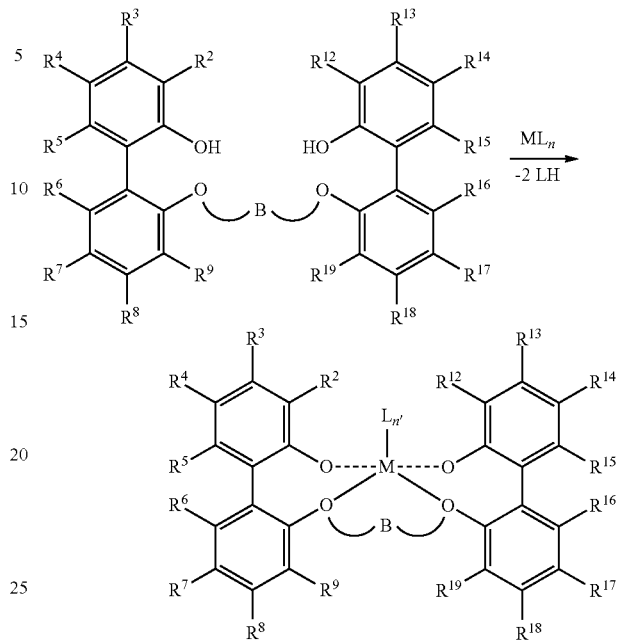

As shown in Scheme 13, a ligand according to formula II is combined with the metal precursor $M(L)_n$ under conditions to cause the removal of at least 2 leaving group ligands L, which are shown in the scheme as combining with a hydrogen (H). Other schemes where the leaving group ligand combines with other moieties (e.g., Li, Na, etc.) employing other known routes for complexation can be used, including for example, reactions where the ligand L reacts with other moieties (e.g., where the alkali metal salt of the ligand is used and the complexation reaction proceeds by salt elimination).

Activators for the Metal-Ligand Complexes

The metal-ligand complexes and compositions are active catalysts in combination with a suitable activator, combination of activators, activating technique or activating package, as well as a suitable support, although some of the ligand-metal complexes may be active without an activator or activating technique depending on the ligand-metal complex and on the process being catalyzed. Broadly, the activator(s) may comprise alumoxanes, Lewis acids, Bronsted acids, compatible non-interfering activators and combinations of the foregoing. These types of activators have been taught for use with different compositions or metal complexes in the following references, which are hereby incorporated by reference in their entirety: U.S. Pat. No. 5,599,761, U.S. Pat. No. 5,616,664, U.S. Pat. No. 5,453,410, U.S. Pat. No. 5,153,157, U.S. Pat. No. 5,064,802, EP-A-277,004 and Marks et al., Chem. Rev. 2000, 100, 1391-1434. In some embodiments, ionic or ion forming activators are preferred. In other embodiments, alumoxane activators are preferred.

Suitable ion forming compounds useful as an activator in one embodiment comprise a cation that is a Bronsted acid capable of donating a proton, and an inert, compatible, non-interfering, anion, $A^-$. Suitable anions include, but are not limited to, those containing a single coordination complex comprising a charge-bearing metal or metalloid core. Mechanistically, the anion should be sufficiently labile to be displaced by olefinic, diolefinic and unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions that comprise coordination complexes containing a single metal or metalloid atom are, of course, well known and many, particularly such compounds containing a single boron atom in the anion portion, are available commercially.

Specifically, such activators may be represented by the following general formula:

$$(L^*-H)_d^+ (A^{d-})$$

wherein L* is a neutral Lewis base; (L*-H)+ is a Bronsted acid; $A^{d-}$ is a non-interfering, compatible anion having a charge of d−, and d is an integer from 1 to 3. More specifically $A^{d-}$ corresponds to the formula: $(M'^{3+}Q_h)^{d-}$ wherein h is an integer from 4 to 6; h−3=d; M' is an element selected from group 13 of the periodic table; and Q is independently selected from the group consisting of hydrogen, dialkylamido, halogen, alkoxy, aryloxy, hydrocarbyl, and substituted-hydrocarbyl radicals (including halogen substituted hydrocarbyl, such as perhalogenated hydrocarbyl radicals), said Q having up to 20 carbons. In a more specific embodiment, d is one, i.e., the counter ion has a single negative charge and corresponds to the formula A.

Activators comprising boron or aluminum can be represented by the following general formula:

$$(L^*-H)^+ (JQ4)^-$$

wherein: L* is as previously defined; J is boron or aluminum; and Q is a fluorinated $C_{1-20}$ hydrocarbyl group. Most specifically, Q is independently selected from the group consisting of fluorinated aryl group, such as a pentafluorophenyl group (i.e., a $C_6F_5$ group) or a 3,5-bis$(CF_3)_2C_6H_3$ group. Illustrative, but not limiting, examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethylanilinium tetra-(3,5-bis(trifluoromethyl)phenyl)borate, N,N-dimethyl-(2,4,6-trimethylanilinium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(secbutyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, trimethylammonium tetrakis-(2,3,4,6-tetrafluorophenylborate and N,N-dimethylanilinium tetrakis-(2,3,4,6-tetrafluorophenyl)borate; dialkyl ammonium salts such as: di-(i-propyl)ammonium tetrakis(pentafluorophenyl)borate, and dicyclohexylammonium tetrakis(pentafluorophenyl)borate; and tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate; N,N-dimethylanilinium tetrakis(3,5-bis(trifluoromethyl)phenyl)borate; HNMe$(C_{18}H_{37})_2^+B(C_6F_5)_4^-$; HNPh$(C_{18}H_{37})_2^+B(C_6F_5)_4^-$ and ((4-nBu-Ph)NH(n-hexyl)$_2)^+B(C_6F_5)_4^-$ and ((4-nBu-Ph)NH(n-decyl)$_2)^+B(C_6F_5)_4^-$. Specific (L*-H)+ cations are N,N-dialkylanilinium cations, such as HNMe$_2$Ph+, substituted N,N-dialkylanilinium cations, such as (4-nBu-$C_6H_4$)NH(n-$C_6H_{13}$)$_2^+$ and (4-nBu-$C_6H_4$)NH(n-$C_{10}H_{21}$)$_2^+$ and HNMe$(C_{18}H_{37})_2^+$. Specific examples of anions are tetrakis(3,5-bis(trifluoromethyl)phenyl)borate and tetrakis(pentafluorophenyl)borate. In some embodiments, the specific activator is PhNMe$_2$H+B$(C_6F_5)_4^-$.

Other suitable ion forming activators comprise a salt of a cationic oxidizing agent and a non-interfering, compatible anion represented by the formula:

$$(Ox^{e+})_d (A^{d-})_e$$

wherein: $Ox^{e+}$ is a cationic oxidizing agent having a charge of e+; e is an integer from 1 to 3; and $A^{d-}$, and d are as previously defined. Examples of cationic oxidizing agents include: ferrocenium, hydrocarbyl-substituted ferrocenium, Ag+, or Pb$^{+2}$. Specific embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound that is a salt of a carbenium ion or silyl cation and a non-interfering, compatible anion represented by the formula:

$$\copyright^+ A^-$$

wherein: $\copyright^+$ is a $C_{1-100}$ carbenium ion or silyl cation; and A− is as previously defined. A preferred carbenium ion is the trityl cation, i.e. triphenylcarbenium. The silyl cation may be characterized by the formula $Z^4Z^5Z^6Si^+$ cation, where each of $Z^4$, $Z^5$, and $Z^6$ is independently selected from the group consisting of hydrogen, halogen, and optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, mercapto, alkylthio, arylthio, and combinations thereof. In some embodiments, a specified activator is Ph$_3C^+$B$(C_6F_5)_4^-$.

Other suitable activating cocatalysts comprise a compound that is a salt, which is represented by the formula $(A^{*+a})_b(Z^*J^*_j)^{-c}_d$ wherein A* is a cation of charge +a; Z* is an anion group of from 1 to 50, specifically 1 to 30 atoms, not counting hydrogen atoms, further containing two or more Lewis base sites; J* independently each occurrence is a Lewis acid coordinated to at least one Lewis base site of Z*, and optionally two or more such J* groups may be joined together in a moiety having multiple Lewis acidic functionality; j is a number form 2 to 12; and a, b, c, and d are integers from 1 to 3, with the proviso that a×b is equal to c×d. See, WO 99/42467, which is incorporated herein by reference. In other embodiments, the anion portion of these activating cocatalysts may be characterized by the formula ((C$_6F_5)_3M''''$-LN-M''''(C$_6F_5)_3)^-$ where M'''' is boron or aluminum and LN is a linking group, which is specifically selected from the group consisting of cyanide, azide, dicyanamide and imidazolide. The cation portion is specifically a quaternary amine See, e.g., LaPointe, et al., *J. Am. Chem. Soc.* 2000, 122, 9560-9561, which is incorporated herein by reference.

In addition, suitable activators include Lewis acids, such as those selected from the group consisting of tris(aryl)boranes, tris(substituted aryl)boranes, tris(aryl)alanes, tris(substituted aryl)alanes, including activators such as tris(pentafluorophenyl)borane. Other useful ion forming Lewis acids include those having two or more Lewis acidic sites, such as those described in WO 99/06413 or Piers, et al. "New Bifunctional Perfluoroaryl Boranes: Synthesis and Reactivity of the ortho-Phenylene-Bridged Diboranes 1,2-(B(C$_6F_5)_2)_2C_6X_4$ (X=H, F)", *J. Am. Chem. Soc.*, 1999, 121, 3244-3245, both of which are incorporated herein by reference. Other useful Lewis acids will be evident to those of skill in the art. In general, the group of Lewis acid activators is within the group of ion forming activators (although exceptions to this general rule can be found) and the group tends to exclude the group 13 reagents listed below. Combinations of ion forming activators may be used.

Other general activators or compounds useful in a polymerization reaction may be used. These compounds may be activators in some contexts, but may also serve other functions in the polymerization system, such as alkylating a metal center or scavenging impurities. These compounds are within the general definition of "activator," but are not considered herein to be ion-forming activators. These compounds include a group 13 reagent that may be characterized by the formula $G^{13}R^{50}_{3-p}D_p$ where $G^{13}$ is selected from the group consisting of B, Al, Ga, In and combinations thereof, p is 0, 1 or 2, each $R^{50}$ is independently selected from the group consisting of hydrogen, halogen, and optionally substituted alkyl, alkenyl, alkynyl, heteroalkyl, heteroalkenyl, heteroalkynyl, aryl, heteroaryl, and combinations thereof, and each D is independently selected from the group consisting of halogen, hydrogen, alkoxy, aryloxy, amino, mercapto, alkylthio, arylthio, phosphino and combinations thereof. In other embodiments, the group 13 activator is an oligomeric or polymeric alumoxane compound, such as methylalumoxane and the known modifications thereof. See, for example, Barron, "*Alkylalumoxanes, Synthesis, Structure and Reactivity*", pp 33-67 in "*Metallocene-Based Polyolefins: Preparation, Properties and Technology*", Edited by J. Schiers and W. Kaminsky, Wiley Series in Polymer Science, John Wiley & Sons Ltd., Chichester, England, 2000, and references cited therein. In other embodiments, a divalent metal reagent may be used that is defined by the general formula $M'R^{50}_{2-p'}D_{p'}$ and p' is 0 or 1 in this embodiment and $R^{50}$ and D are as defined above. M' is the metal and is selected from the group consisting of Mg, Ca, Sr, Ba, Zn, Cd and combinations thereof. In still other embodiments, an alkali metal reagent may be used that is defined by the general formula $M''R^{50}$ and in this embodiment $R^{50}$ is as defined above. M" is the alkali metal and is selected from the group consisting of Li, Na, K, Rb, Cs and combinations thereof. Additionally, hydrogen and/or silanes may be used in the catalytic composition or added to the polymerization system. Silanes may be characterized by the formula $SiR^{50}_{4-q}D_q$ where $R^{50}$ is defined as above, q is 1, 2, 3 or 4 and D is as defined above, with the proviso that there is at least one D that is a hydrogen.

The activator or a combination of activators may be supported on an organic or inorganic support. Suitable supports include silicas, aluminas, clays, zeolites, magnesium chloride, polystyrenes, substituted polystyrenes. The activator may be co-supported with the metal-ligand complex. Suitable metal-ligand supports are more fully described in the section entitled "Catalyst Supports" below.

The molar ratio of metal:activator (whether a composition or complex is employed as a catalyst) employed specifically ranges from 1:10,000 to 100:1, more specifically from 1:5000 to 10:1, most specifically from 1:10 to 1:1. In one embodiment of the invention mixtures of the above compounds are used, particularly a combination of a group 13 reagent and an ion-forming activator. The molar ratio of group 13 reagent to ion-forming activator is specifically from 1:10,000 to 1000:1, more specifically from 1:5000 to 100:1, most specifically from 1:100 to 100:1. In another embodiment, the ion forming activators are combined with a group 13 reagent. Another embodiment is a combination of the above compounds having about 1 equivalent of an optionally substituted N,N-dialkylanilinium tetrakis(pentafluorophenyl)borate, and 5-30 equivalents of a group 13 reagent. In some embodiments from about 30 to 2000 equivalents of an oligomeric or polymeric alumoxane activator, such as a modified alumoxane (e.g., alkylalumoxane), can be used.

In other applications, the ligand will be mixed with a suitable metal precursor compound prior to or simultaneous with allowing the mixture to be contacted to the reactants. When the ligand is mixed with the metal precursor compound, a metal-ligand complex may be formed, which may be a catalyst.

Catalyst Supports

The ligands, complexes or catalysts may be supported on organic or inorganic supports, in combination with an appropriate activator, in order to obtain the supported catalyst of the present invention. Suitable supports include silicas, aluminas, clays, zeolites, magnesium chloride, polystyrenes, substituted polystyrenes and the like. Polymeric supports may be cross-linked or not. Similarly, the ligands, complexes, catalysts or activators may be supported on supports known to those of skill in the art. See for example, Hlatky, *Chem. Rev.* 2000, 100, 1347-1376 and Fink et al., *Chem. Rev.* 2000, 100, 1377-1390, both of which are incorporated herein by reference. The compositions, complexes and/or catalysts may be contacted with an activator (described above) before or after contact with the support; alternatively, the support may be contacted with the activator prior to contact with the composition, complex or catalyst. In addition, the catalysts of this invention may be combined with other catalysts in a single reactor and/or employed in a series of reactors (parallel or serial) in order to form blends of polymer products.

In one embodiment, the loading of the metal-ligand complex deposited on the support is from about 1 μmol/gram of supported catalyst to about 100 μmol/gram of supported catalyst. In another embodiment, the loading is from about 2 μmol/gram of supported catalyst to about 100 μmol/gram of supported catalyst and, in another embodiment, from about 4 μmol/gram of supported catalyst to about 100 μmol/gram of supported catalyst. In another embodiment, the loading of the metal-ligand complex deposited on the support is from about 1 μmol/gram of supported catalyst to about 50 μmol/gram of supported catalyst. In another embodiment, the loading is from about 2 μmol/gram of supported catalyst to about 50 μmol/gram of supported catalyst and, in another embodiment, from about 4 μmol/gram of supported catalyst to about 50 μmol/gram of supported catalyst. In other embodiments, the loading of the metal-ligand complex deposited on the support is from about 1 μmol/gram of supported catalyst to about 25 μmol/gram of supported catalyst, from about 2 μmol/gram of supported catalyst to about 25 μmol/gram of supported catalyst or from about 4 μmol/gram of supported catalyst to about 25 μmol/gram of supported catalyst. In other embodiments, the loading of the metal-ligand complex deposited on the support is from about 1 μmol/gram of supported catalyst to about 20 μmol/gram of supported catalyst, from about 2 μmol/gram of supported catalyst to about 20 μmol/gram of supported catalyst or from about 4 μmol/gram of supported catalyst to about 20 μmol/gram of supported catalyst. In further embodiments, the loading of the metal-ligand complex deposited on the support is from about 1 μmol/gram of supported catalyst to about 15 μmol/gram of supported catalyst, from about 2 μmol/gram of supported catalyst to about 15 μmol/gram of supported catalyst or from about 4 μmol/gram of supported catalyst to about 15 μmol/gram of supported catalyst. In additional embodiments, the loading of the metal-ligand complex deposited on the support is from about 1 μmol/gram of supported catalyst to about 10 μmol/gram of supported catalyst, from about 2 μmol/gram of supported catalyst to about 10 μmol/gram of supported catalyst or even from about 3 µmol/gram of supported catalyst to about 10 µmol/gram of supported catalyst. In other embodiments, the loading of the metal-ligand complex deposited on the support is about 1 µmol/gram of supported catalyst, about 2 µmol/gram, about 4 µmol/gram, about 10 µmol/gram, about 20 µmol/gram, about 30 µmol/gram, about 40 µmol/gram, about 50 µmol/gram or even about 100 µmol/gram.

Two different metal-ligand complexes may be deposited on the organic or inorganic support to form a two component co-supported catalyst. Such two component catalysts are particularly useful for the production of bimodal ultra-high molecular weight polyethylene. In one embodiment, the total loading of the two metal-ligand complexes deposited on the support is from about 1 µmol/gram of supported catalyst to about 100 µmol/gram of supported catalyst. In another embodiment, the total loading of the metal-ligand complexes deposited on the support is from about 2 µmol/gram of supported catalyst to about 100 µmol/gram of supported catalyst and, in another embodiment, from about 4 µmol/gram of supported catalyst to about 100 µmol/gram of supported catalyst. In one embodiment, the total loading of the two metal-ligand complexes deposited on the support is from about 1 µmol/gram of supported catalyst to about 50 µmol/gram of supported catalyst. In another embodiment, the total loading of the metal-ligand complexes deposited on the support is from about 2 µmol/gram of supported catalyst to about 50 µmol/gram of supported catalyst and, in another embodiment, from about 4 µmol/gram of supported catalyst to about 50 µmol/gram of supported catalyst. In further embodiments, the loading of the metal-ligand complexes deposited on the support is from about 1 µmol/gram of supported catalyst to about 25 µmol/gram of supported catalyst, from about 2 µmol/gram of supported catalyst to about 25 µmol/gram of supported catalyst or from about 4 µmol/gram of supported catalyst to about 25 µmol/gram of supported catalyst. In other embodiments, the loading of the metal-ligand complexes deposited on the support is from about 1 µmol/gram of supported catalyst to about 20 µmol/gram of supported catalyst, from about 2 µmol/gram of supported catalyst to about 20 µmol/gram of supported catalyst or from about 4 µmol/gram of supported catalyst to about 20 µmol/gram of supported catalyst. In additional embodiments, the loading of the metal-ligand complexes deposited on the support is from about 1 µmol/gram of supported catalyst to about 10 µmol/gram of supported catalyst, from about 2 µmol/gram of supported catalyst to about 10 µmol/gram of supported catalyst or even from about 4 µmol/gram of supported catalyst to about 10 µmol/gram of supported catalyst. In other embodiments, the loading of the metal-ligand complexes deposited on the support is about 1 µmol/gram of supported catalyst, about 2 µmol/gram, about 4 µmol/gram, about 10 µmol/gram, about 20 µmol/gram, about 30 µmol/gram, about 40 µmol/gram, about 50 µmol/gram or even about 100 µmol/gram.

When two metal-ligand complexes are deposited on the support, the molar ratio of the first complex to the second complex may be about 1:1, or alternatively the supported two-component complex may include a molar excess of one of the complexes relative to the other. For example, the ratio of the first complex to the second complex may be about 1:2; about 1:3; about 1:5; about 1:10; about 1:20 or more. In one embodiment, the ratio of the first metal-ligand complex to the second metal-ligand complex deposited on the support is between about 1:1 and 1:10 and in another embodiment between about 1:1 to about 1:5. Further, the ratio may be adjusted as needed and may be determined experimentally in order to obtain a bimodal composition with a target split between the high molecular weight component and the low molecular weight polyethylene component.

Utilization of Supported Ligand-Metal Complexes as Catalyst

The supported catalysts of the invention can be used to catalyze a variety of transformations, including, for example, oxidation, reduction, hydrogenation, hydrosilylation, hydrocyanation, hydroformylation, polymerization, carbonylation, isomerization, metathesis, carbon-hydrogen activation, carbon-halogen activation, cross-coupling, Friedel-Crafts acylation and alkylation, hydration, Diels-Alder reactions, Baeyer-Villiger reactions, and other transformations. Some compositions, complexes and/or catalysts according to the invention are particularly effective at polymerizing ethylene to obtain a UHMWPE polymer, or a bimodal polymer composition comprising UHMWPE. Alternatively, however, some compositions, complexes and/or catalysts according to the invention are particularly effective at polymerizing α-olefins (such as propylene, 1-butene, 1-pentene, 1-hexene, 1-heptene, 1-octene, and styrene), copolymerizing ethylene with α-olefins (such as propylene, 1-butene, 1-pentene, 1-hexene, 1-heptene, 1-octene, and styrene), copolymerizing ethylene with 1,1-disubstituted olefins (such as isobutylene), or copolymerizing ethylene, propylene and a diene monomer suitable for production of EPDM (Ethylene-Propylene-Diene Monomer) synthetic rubbers. Thus, for example, in some embodiments, metal-ligand compositions and complexes containing zirconium or hafnium may be useful in the polymerization of ethylene alone, or in combination with one or more α-olefins, as noted above.

In general, monomers useful herein may be olefinically unsaturated monomers having from 2 to 20 carbon atoms either alone or in combination. Generally, monomers may include olefins (including cyclic olefins), diolefins and unsaturated monomers including ethylene and $C_3$ to $C_{20}$ α-olefins such as propylene, 1-butene, 1-hexene, 1-octene, 4-methyl-1-pentene, 1-norbornene, styrene and mixtures thereof; additionally, 1,1-disubstituted olefins, such as isobutylene, 2-methyl-1-butene, 2-methyl-1-pentene, 2-ethyl-1-pentene, 2-methyl-1-hexene, 3-trimethylsilyl-2-methyl-1-propene, α-methyl-styrene, either alone or with other monomers such as ethylene or $C_3$ to $C_{20}$ α-olefins and/or diolefins; additionally 1,2-substituted olefins, such as 2-butene. The α-olefins listed above may be polymerized in a stereospecific manner—for example, as in the generation of isotactic or syndiotactic or hemiisotactic polypropylene. Additionally the α-olefins may be polymerized to produce a polymer with differing tacticity sequences within the polymer chain, such as polypropylene containing atactic and isotactic sequences within the same polymer chain. Diolefins generally comprise 1,3-dienes such as (butadiene), substituted 1,3-dienes (such as isoprene) and other substituted 1,3-dienes, with the term substituted referring to the same types of substituents referred to above in the definition section. Diolefins also comprise 1,5-dienes and other non-conjugated dienes, such as ethylidene-norbornene, 1,4-hexadiene, dicyclopentadiene and other dienes used in the manufacture of EPDM synthetic rubbers. The styrene monomers may be unsubstituted or substituted at one or more positions on the aryl ring. The use of diolefins in this invention is typically in conjunction with another monomer that is not a diolefin.

More specifically, it has been found that the catalysts of the present invention are particularly active for certain monomers, particularly ethylene or α-olefins. Polymers that can be prepared according to the present invention include ethylene copolymers with at least one $C_3$-$C_{20}$ α-olefin, particularly propylene, 1-butene, 1-hexene, 4-methyl-1-pentene and 1-octene. The copolymers of ethylene with at least one $C_3$-$C_{20}$ α-olefin comprise from about 0.1 mol.% α-olefin to about 50 mol.% α-olefin, more specifically from about 0.2 mol.% α-olefin to about 30 mol.% α-olefin and still more specifically from about 2 mol.% α-olefin to about 5 mol.% higher olefin.

The α-olefins listed above may be polymerized in a stereoselective manner to produce a substantially stereoregular polymer product (that is, a polymer product that is detectably enriched in m or r dyads (as determined, e.g., by $^{13}$C NMR) as compared to a corresponding atactic material), as in the generation of isotactic, syndiotactic or hemiisotactic poly-α-olefins and as more fully described in U.S. Pat. No. 7,060,848, the entire contents of which are incorporated herein by reference for all relevant and consistent purposes.

Novel polymers, copolymers or interpolymers may be formed having unique physical and/or melt flow properties. Polymers that can be prepared according to the present invention include copolymers of ethylene and one or more α-olefins, such as copolymers of ethylene with at least one $C_4$-$C_{20}$ α-olefin, such as 1-butene, 1-hexene, 4-methyl-1-pentene, 1-octene or styrene. Similarly, the techniques described herein can be used to prepare propylene copolymers with at least one $C_4$-$C_{20}$ α-olefin. In some embodiments, the copolymers of ethylene or propylene with at least one $C_4$-$C_{20}$ α-olefin comprise from about 0.01 mol.% higher olefin to about 50 mol.% higher olefin, more specifically from about 0.1 mol.% higher olefin to about 50 mol.% higher olefin and still more specifically from about 1 mol.% higher olefin to about 30 mol.% higher olefin. For certain embodiments of this invention, crystalline copolymers include those of ethylene and a comonomer selected from the group consisting of 1-butene, 1-hexene, 1-octene and styrene comprise from about 0.1 to about 50 mol.% comonomer, more specifically from about 1 to about 20 mol. % comonomer, even more specifically from about 2 to about 15 mol. % comonomer and most specifically from about 5 to about 12 mol. % comonomer.

Polymerization is carried out under polymerization conditions, including temperatures of from −100° C. to 300° C. and pressures from atmospheric to 3000 atmospheres. Suspension, solution, slurry, gas phase or high-pressure polymerization processes may be employed with the catalysts and compounds of this invention. Such processes can be run in a batch, semi-batch or continuous mode. Examples of such processes are well known in the art. A support for the catalyst may be employed, which may be inorganic (such as alumina, magnesium chloride or silica) or organic (such as a polymer or cross-linked polymer). Methods for the preparation of supported catalysts are known in the art. Slurry, suspension, gas phase and high-pressure processes as known to those skilled in the art may also be used with supported catalysts of the invention.

Other additives that are useful in a polymerization reaction may be employed, such as scavengers, promoters, modifiers and/or chain transfer agents, such as hydrogen, aluminum alkyls and/or silanes.

As discussed herein, catalytic performance can be determined a number of different ways, as those of skill in the art will appreciate. Catalytic performance can be determined by the yield of grams of polymer obtained per gram of catalyst per hour or as the yield of grams of polymer per grams of catalyst metal per hour, which in some contexts may be considered to be activity. The examples provide data for these comparisons.

Another measure of catalyst polymerization performance is co-monomer incorporation. As is well known in the art, many ethylene copolymers are prepared using ethylene and at least one other monomer. These copolymers or higher order polymers in some applications require higher amounts of additional co-monomer(s) than have been practical with known catalysts. Since ethylene tends to be the most reactive monomer, obtaining higher co-monomer incorporations is a benefit that is examined for polymerization catalysts. Two useful co-monomers are 1-octene and styrene. This invention offers the possibility of higher incorporation of co-monomers such as 1-octene and styrene.

As stated herein, a solution process is specified for certain benefits, with the solution process being run at a temperature above 90° C., more specifically at a temperature above 100° C., further more specifically at a temperature above 110° C. and even further more specifically at a temperature above 130° C. Suitable solvents for polymerization are non-coordinating, inert liquids. Examples include straight and branched-chain hydrocarbons such as isobutane, butane, pentane, isopentane, hexane, isohexane, heptane, octane, Isopar-E® and mixtures thereof; cyclic and alicyclic hydrocarbons such as cyclohexane, cycloheptane, methylcyclohexane, methylcycloheptane, and mixtures thereof; perhalogenated hydrocarbons such as perfluorinated $C_{4-10}$ alkanes, chlorobenzene, and aromatic and alkyl substituted aromatic compounds such as benzene, toluene, mesitylene, and xylene. Suitable solvents also include liquid olefins which may act as monomers or comonomers including ethylene, propylene, 1-butene, butadiene, cyclopentene, 1-hexene, 1-pentene, 3-methyl-1-pentene, 4-methyl-1-pentene, 1,4-hexadiene, 1-octene, 1-decene, isobutylene, styrene, divinylbenzene, allylbenzene, and vinyltoluene (including all isomers alone or in admixture). Mixtures of the foregoing are also suitable.

In addition to polymerization of olefinic monomers, the ligands, compositions, and complexes according to the invention can be incorporated in catalysts for the selective dimerization, trimerization or oligomerization of olefinic monomers, such as the selective trimerization of ethylene to 1-hexene. See, for example, Forni and Invernizzi, *Ind. Eng. Chem. Process Des. Develop.* 1973, 12, 455-459; Svejda and Brookhart, *Organometallics* 1999, 18, 65-75; Agapie et al., *J. Am. Chem. Soc.* 2004, 126, 1304-1305; Carter et al., *Chem. Comm.* 2002, 858-859; Deckers et al., *Organometallics* 2002, 21, 5122-5135; McGuinness et al., *Chem. Comm.* 2003, 334-335; McGuinness et al., *J. Am. Chem. Soc.* 2003, 125, 5272-5273; EP 1,110,930; WO 02/083306; and WO 01/48028.

The ligands, metal-ligand complexes and compositions of this invention can be prepared and tested for catalytic activity in one or more of the above reactions in a combinatorial fashion as described in U.S. Pat. No. 7,060,848, the entire contents of which are incorporated herein by reference for all relevant and consistent purposes.

Methods for Polymerizing Polyethylene by the Use of Supported Catalysts

The supported catalysts described herein (i.e., a catalyst comprising a support, an activator, and one or more metal-ligand complexes) are particularly well suited for use in the production of very-high or ultra-high molecular weight polyethylene. According to one embodiment of the present invention, a supported catalyst as described herein is utilized to produce a very-high or ultra-high molecular weight polyethylene composition of a specific target molecular weight. The method includes selecting a target molecular weight of the polyethylene composition and correlating the target molecular weight to the loading of a metal-ligand complex on a support. After the loading of the metal-ligand complex on the support has been determined, one or more monomers are contacted with a supported catalyst having the correlated metal-ligand loading.

According to another embodiment of the present invention for preparing a very-high or ultra-high molecular weight polyethylene composition, the composition of the metal-ligand complex, i.e., the specific metal-ligand complex utilized in the polymerization reaction, is chosen to provide a target molecular weight of the polyethylene composition. According to the method, a target molecular weight of the polyethylene composition is selected and the target molecular weight is correlated to a specific metal-ligand complex on a support. One or more monomers are contacted with the supported catalyst to produce the polyethylene composition having the targeted molecular weight.

In another embodiment, a bimodal polyethylene composition is produced by contacting one or more monomers with a two component co-supported catalyst (i.e., a catalyst comprising two different metal-ligand complexes). The polyethylene composition includes a first polyethylene component that is a very-high or an ultra-high molecular weight component or portion and a second polyethylene component that is a very-high or high molecular weight polyethylene component or portion. One of the metal-ligand complexes deposited on the support produces the first polyethylene component and the other metal-ligand complex deposited on the support produces the second polyethylene component. In some embodiments, the weight ratio of the first component versus the second polyethylene component may range from about 1:10 to about 10:1; or from about 1:4 to about 4:1; or from about 1:2 to about 2:1. In some embodiments, the ratio of the first polyethylene component to the second polyethylene component is about 1:1.

EXAMPLES

It is to be noted that, in addition to the Examples provided below, other examples related to the synthesis of specific ligands suitable for use in the present invention may be found, for example, in WO 2005/108406 and WO 2003/091262, the entire contents of which are incorporated herein by reference for all relevant and consistent purposes.

All reactions in Examples 1-4 were performed under a purified argon or nitrogen atmosphere in a Vacuum Atmospheres or MBraun glove box. All solvents were anhydrous, de-oxygenated and purified according to known techniques. All ligands and metal precursors were prepared according to procedures known to those of skill in the art, e.g., under inert atmosphere conditions, etc. Polymerizations were carried out in a parallel pressure reactor, which is fully described in U.S. Pat. No. 6,548,026, which is incorporated herein by reference.

High temperature Size Exclusion Chromatography was performed using an automated "Rapid GPC" system as described in U.S. Pat. No. 6,491,816, U.S. Pat. No. 6,491,823, U.S. Pat. No. 6,475,391, U.S. Pat. No. 6,461,515, U.S. Pat. No. 6,436,292, U.S. Pat. No. 6,454,947, and 6,855,258, the entire contents of which are incorporated herein by reference for all relevant and consistent purposes. The device used features a series of two 30 cm×7.5 mm linear columns containing PLgel 20 um Mixed-A (available from Polymer Labs). The system was operated at an eluent flow rate of 1.5 mL/min and an oven temperature of 165° C. O-dichlorobenzene was used as the eluent. The polymer samples were dissolved in 1,2,4-trichlorobenzene at a concentration of about 1 mg/mL. About 200 μL of a polymer solution was injected into the system. The concentration of the polymer in the eluent was monitored using an evaporative light scattering detector. The GPC system was calibrated using 8 commercial UHMWPE materials with reported Margolies molecular weights. The molecular weight results are given relative to the commercial sample Margolies molecular weights. Conventional size exclusion chromatography was performed using a Polymer Labs PL210 instrument equipped with one 30 cm PL Mixed-A column (available from Polymer Labs). The system was operated at an eluent flow rate of 0.5 mL/min and an oven temperature of 165° C. 1,2,4-trichlorobenzene was used as the eluent. The polymer samples were dissolved 1,2,4-trichlorobenzene at a concentration of about 2 mg/mL. The concentration of the polymer in the eluent was monitored using a refractive index detector. High temperature Size Exclusion Chromatography methods for ultra-high molecular weight polymers, including UHMWPE, is described in detail in Xu et al., Macromol. Rapid Commun., 1998, 19, pp 115-118, and Aust, *J. Biochem. Biophys. Methods,* 2003, 56, pp 323-334.

Examples of metal-ligand complexes are shown below:

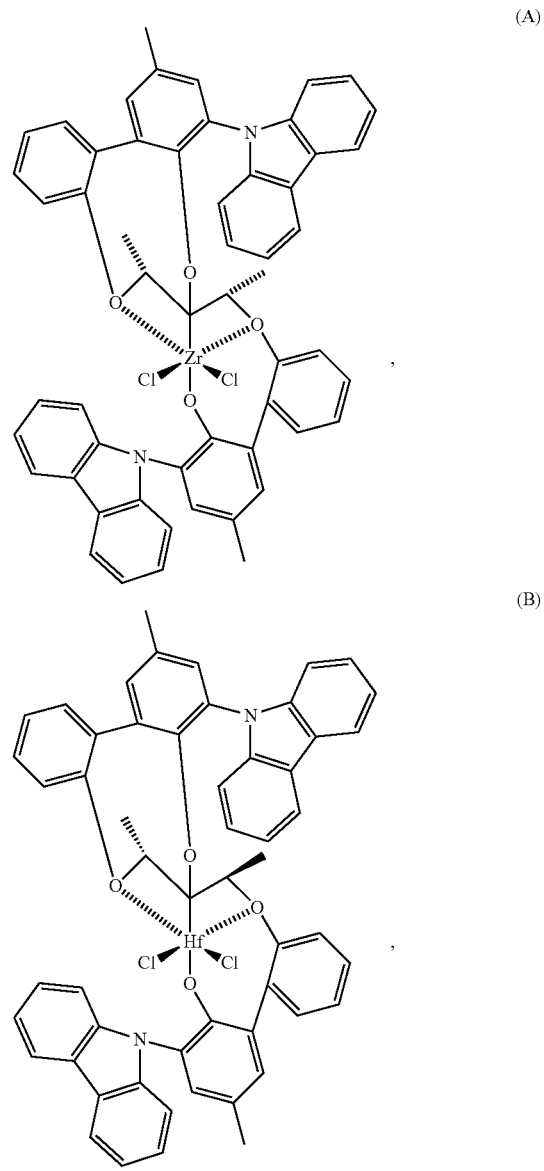

-continued

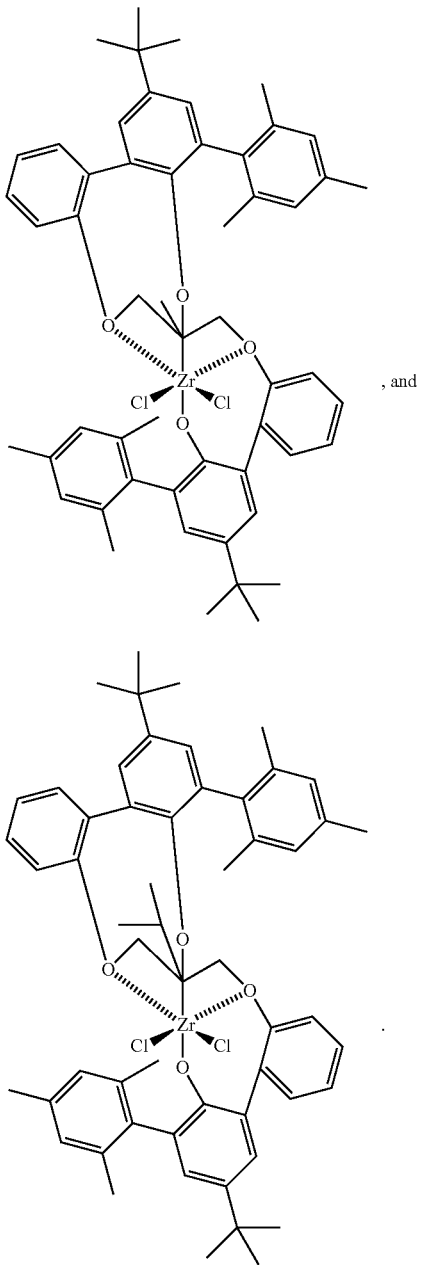

All ligands were synthesized as described in WO 2005/108406. The ligand for complex A was synthesized similarly to the ligand for complex B except the diol starting material was a mixture of cis- and trans-pentane-2,4-diol. The ligand for complex C was synthesized similarly starting with MOM-protected mesityl substituted upper ring building block and 2-Me-1,3-propanediol. The ligand for complex D was synthesized similarly stating with MOM-protected mesityl substituted upper ring building block and 2-iPr-1,3-propanediol.

The ligands were complexed with $Hf(CH_2Ph)_2Cl_2(EtO)$ (for complex B) and $Zr(CH_2Ph)_2Cl_2(EtO)$ (for complexes A, C and D) in toluene at 80-100° C. for 1-3 hours. The reaction mixtures were concentrated and cooled to –30° C. over night. For complexes and D, pentane was added to the concentrated toluene reaction mixture before cooling. The complexes A-D were obtained as crystalline material.

Example 1

Preparation of Silica-Based Supports with a PMAO Activator

Davison 948 Silica previously calcined at 600° C. under nitrogen (1000 mg) was placed in a 20 ml scintillation vial. The silica was slurried in toluene (5.33 mL). PMAO-IP (4.666 mL of a 1.5 M solution in toluene) was added to the vortexing silica/toluene slurry. The reaction mixture was slurried for 30 minutes at room temperature and then heated to 50° C. The diluent was then removed by a stream of nitrogen with continuous vortexing and heating at 50° C. A dry material was obtained after 2.5 hours. This material was further dried under vacuum at 50° C. for an additional hour resulting in 1506 mg of PMAO-IP/silica supported activator.

Example 2

Preparation of Supported Catalysts with a Single Complex

Around 100 mg PMAO-IP/silica supported activator was weighed into an 8 ml vial. Heptane (1 ml) was added and the support was slurried by vortexing. Complex A (0.5 mL of a 1 mM toluene solution) was added to the silica slurry in heptane and allowed to react for 1 hour at room temperature in the capped vial under continuous vortexting. The cap was replaced by a septum fitted with needles to enable a nitrogen purge of the vial. The reaction mixture was heated to 50° C. under continuous vortexing. The diluents were removed by a stream of nitrogen flowing throughout the vial via the purge needles for 1 hour, resulting in a dry product. Supported catalysts using complex B, C and D were prepared similarly, as described in Table 2.

TABLE 2

Preparation conditions for supported catalysts including metal-ligand complexes A, B, C and D.

| Catalyst Composition | Metal-Ligand Complex | Total complex loading [umol/gram] | PMAO-IP/silica [mg] | Catalyst solution 1 mM [uL] |
|---|---|---|---|---|
| 1 | A | 4.9 | 102 | 500 |
| 2 | B | 4.9 | 103 | 500 |
| 3 | C | 4.9 | 102 | 500 |
| 4 | D | 4.9 | 102 | 500 |

Note:
Complex loading is calculated as micromoles of complex per gram of supported activator (PMAO-IP/silica)

Example 3

Preparation of Co-Supported Catalysts Comprising Two Complexes

Around 50 mg PMAO-IP/silica supported activator was weighed into an 8 ml vial. Heptane (0.5 ml) was added and the support was slurried by vortexing. 1 mM toluene solutions of complex A (185 uL) and complex C (160 ul) were combined and added to the PMAO-IP/silica slurry in heptane and allowed to react for 1 hour at room temperature in the capped vial with continuous vortexing. The cap was replaced by a septum fitted with purge needles. The reaction mixture was heated to 50° C. under continuous vortexing. The diluents were removed by a stream of nitrogen flowing through the purge needles for 1 hour, resulting in dry product. Three additional catalysts using different combinations of complexes were similarly prepared as described in Table 3.

TABLE 3

Preparation conditions for two component supported cataqlysts that each include two metal-ligand complexes selected from A, B, C and D

| Catalyst Composition | Metal-Ligand Complex 1 | Metal-Ligand Complex 2 | PMAO-IP/silica [mg] | Complex 1 Solution (1 mM) [uL] | Complex 2 Solution (1 mM) [uL] | Total complex loading [umol/gram] | Complex 1 loading [umol/gram] | Complex 2 loading [umol/gram] |
|---|---|---|---|---|---|---|---|---|
| 5 | A | C | 51.5 | 189.6 | 165.8 | 6.9 | 3.7 | 3.2 |
| 6 | A | D | 50.6 | 186.3 | 96 | 5.6 | 3.7 | 1.9 |
| 7 | B | C | 51.3 | 724.7 | 165.2 | 17.3 | 14.1 | 3.2 |
| 8 | B | D | 51.2 | 723.3 | 97.1 | 16 | 14.1 | 1.9 |

Note:
Complex loadings are calculated as micromoles of complex per gram of supported activator (PMAO-IP/silica)

Example 4

Ethylene Polymerizations Using Catalysts from Examples 2 and 3

A total of 8 separate polymerization reactions were performed. A pre-weighed glass vial insert and disposable stirring paddle were fitted to each reaction vessel of the reactor. The reactor was then closed and the atmosphere inside the reactor was replaced with ethylene. 0.25 mL of a 0.02 M solution of TIBA (triisobutyl aluminum) in heptane followed by the amount of heptane listed in Table 4, were injected into each pressure reaction vessel through a valve (with specific diluent amounts for each polymerization example being listed in Table 4). The temperature was then set to 90° C. and the stirring speed was set to 800 rpm, and the mixture was exposed to ethylene at a pressure of 150 psi. An ethylene pressure of 150 psi in the pressure cell and the temperature setting were maintained, using computer control, until the end of the polymerization experiment.

TABLE 4

Diluent amounts for each polymerization reaction.

| Catalyst Composition | Supported catalyst slurry [ul] | Supported catalyst slurry [mg] | heptane [ul] | Heptane Chaser [ul] | Heptane Buffer [ul] |
|---|---|---|---|---|---|
| 1 | 100 | 0.2 | 4050 | 480 | 120 |
| 2 | 400 | 0.8 | 3850 | 400 | 100 |
| 3 | 100 | 0.2 | 4050 | 480 | 120 |
| 4 | 100 | 0.2 | 4050 | 480 | 120 |
| 5 | 100 | 0.2 | 4050 | 480 | 120 |

TABLE 4-continued

Diluent amounts for each polymerization reaction.

| Catalyst Composition | Supported catalyst slurry [ul] | Supported catalyst slurry [mg] | heptane [ul] | Heptane Chaser [ul] | Heptane Buffer [ul] |
|---|---|---|---|---|---|
| 6 | 100 | 0.2 | 4050 | 480 | 120 |
| 7 | 100 | 0.2 | 4050 | 480 | 120 |
| 8 | 100 | 0.2 | 4050 | 480 | 120 |

The supported metal-ligand complexes prepared in Examples 2 and 3 were used for the polymerization reactions. A catalyst (12 mg) was weighed into an 8 mL vial, and 6 mL of docedene was added as diluent. The vial was shaken and then placed onto a vortexer. The suspended catalyst slurry was aspirated into a fine gauged needle from the vortexing vial and a heptane "buffer" volume was aspirated to act as barrier. The buffer followed by the catalyst was injected into the prepressurized reaction vessel and was followed immediately by injection of heptane "chaser" volume. Table 4 shows the amount of catalyst injected for each of the eight compositions.

The polymerization reaction was allowed to continue for between about 1900 and 4400 seconds, during which time the temperature and pressure were maintained at their pre-set levels by computer control. The specific polymerization times for each polymerization are shown in Table 5. After the reaction time elapsed, the reaction was quenched by addition of an overpressure of carbon dioxide sent to the reactor. The polymerization times were the lesser of the maximum desired polymerization time or the time taken for a predetermined amount of monomer (ethylene) gas to be consumed in the polymerization reaction.

TABLE 5

Polymerization time for each polymerization reaction.

| Supported Catalyst identity | Reaction time [seconds] | Yield [mg] | Activity [g/g supported catalyst * hr] | Activity [g/g catalyst metal * hr] | Calculated Margolies MW derived from Rapid GPC [g/mol] | MWD (Mw/Mn) from Rapid GPC |
|---|---|---|---|---|---|---|
| 1 | 4381 | 170 | 699 | 1,564,200 | 6,570,400 | 1.6 |
| 2 | 3597 | 175 | 219 | 250,390 | 7,505,225 | 1.7 |
| 3 | 3676 | 175 | 856 | 1,91,550 | 2,494,630 | 2.3 |
| 4 | 1980 | 177 | 1610 | 3,30,280 | 2,457,920 | 2.1 |
| 5 | 2872 | 178 | 1257 | 1,997,500 | 2,529,825 | 7.4 |
| 6 | 3436 | 182 | 1161 | 2,273,300 | 10,120,460 | 2.2 |
| 7 | 2938 | 177 | 1076 | 383,100 | 4,327,953 | 3.6 |
| 8 | 3487 | 178 | 1513 | 562,430 | 5,458625 | 2.8 |

Figure 2:
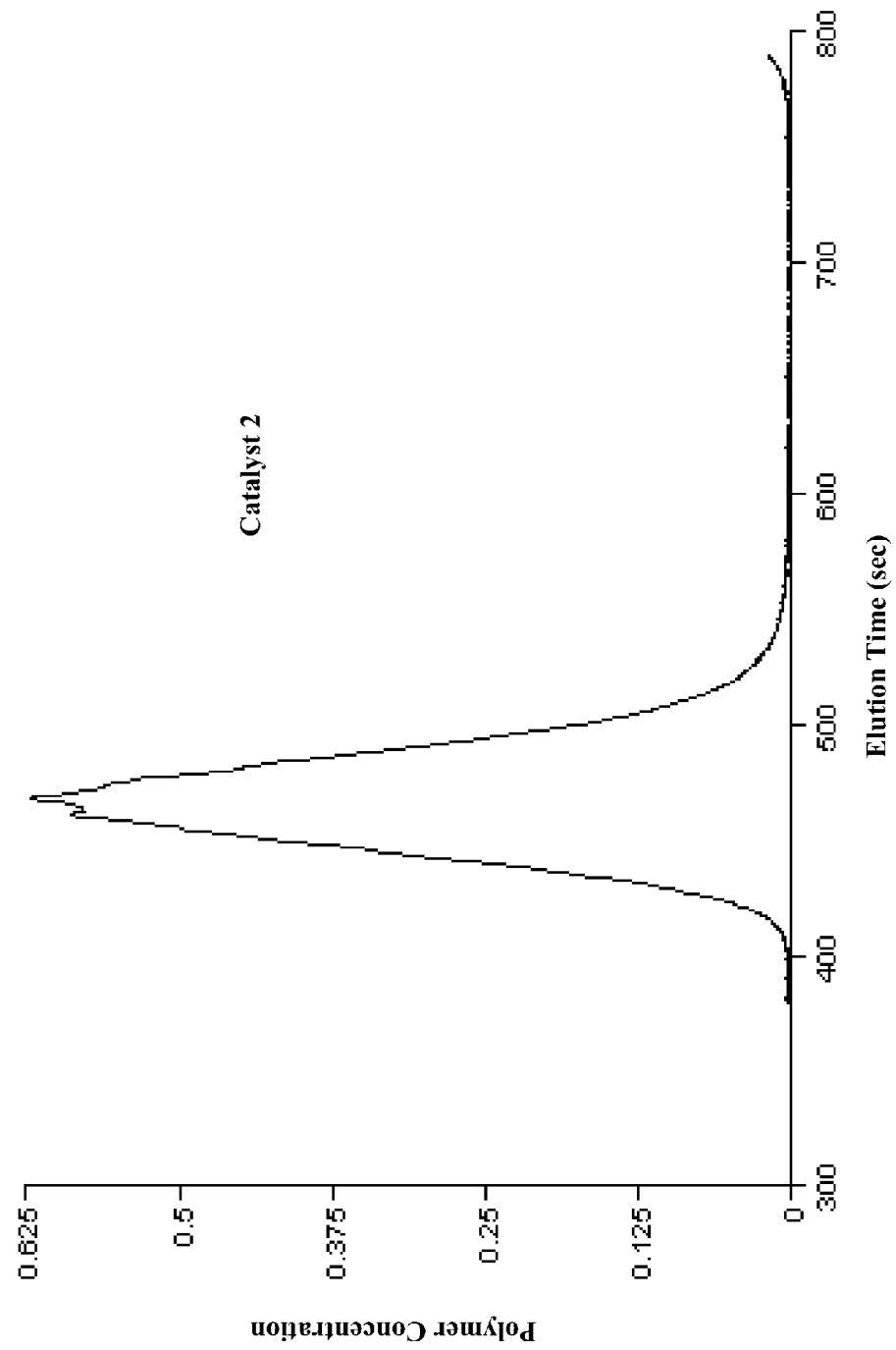
Figure 3:
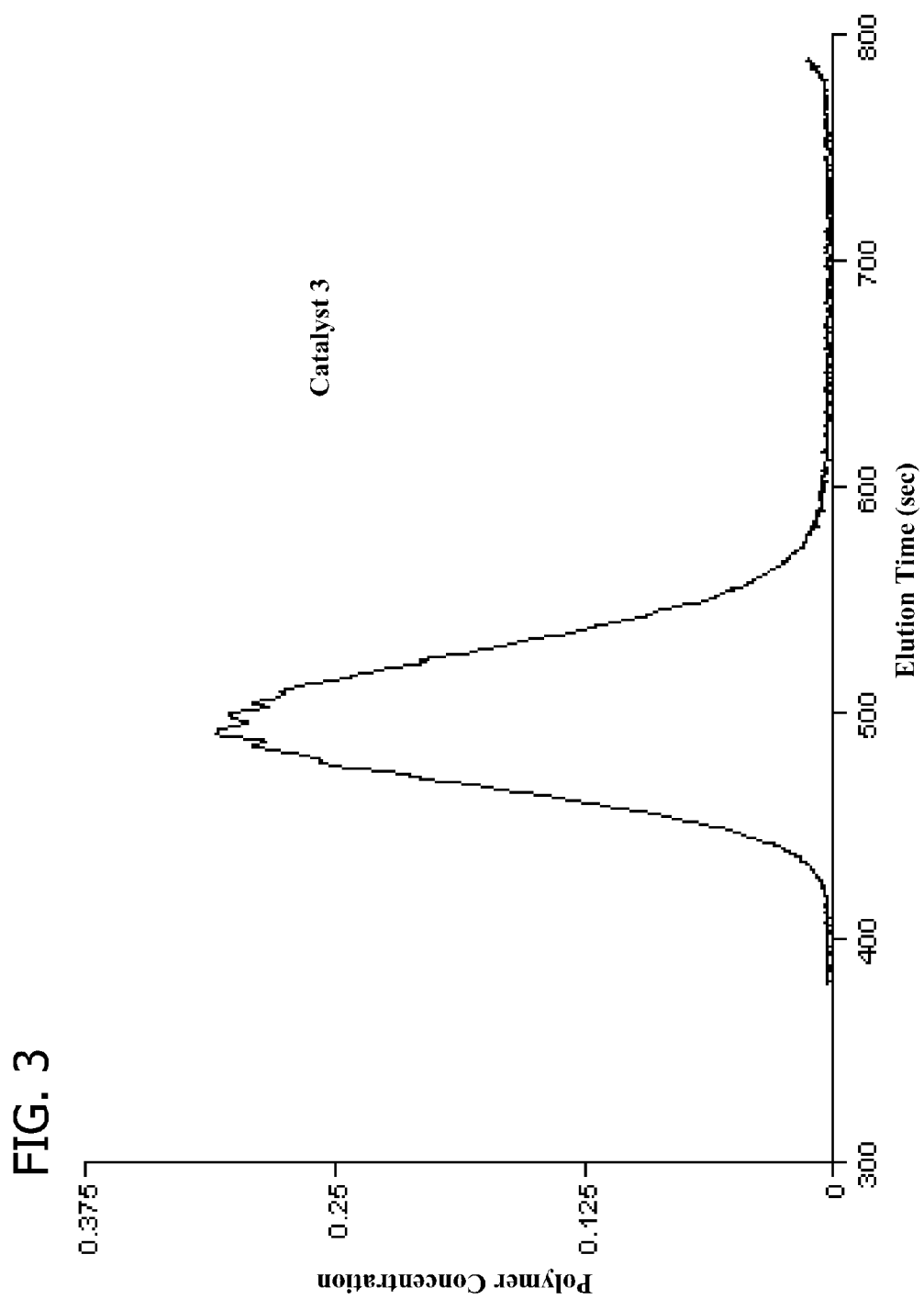
Figure 4:
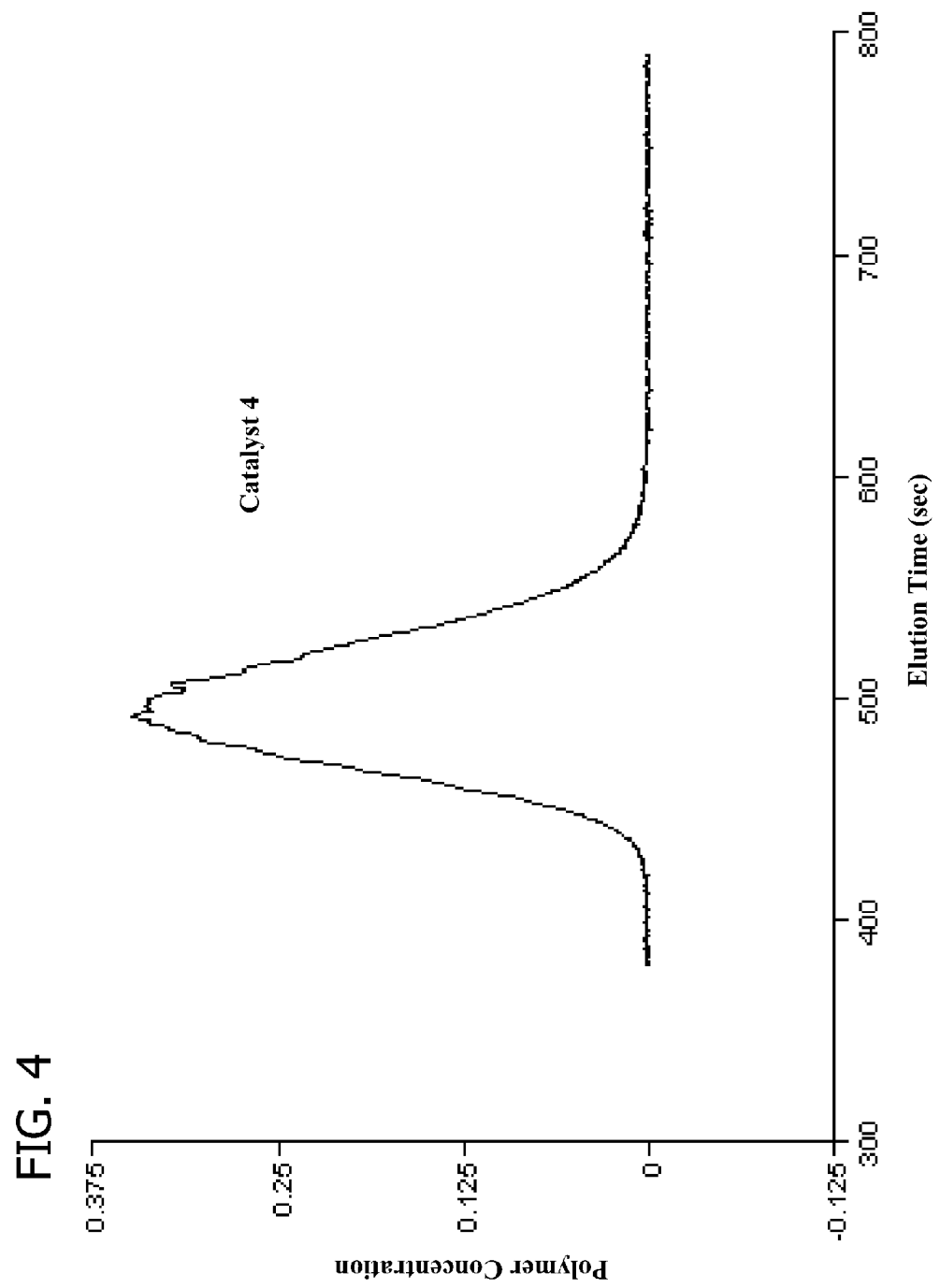
Figure 5:
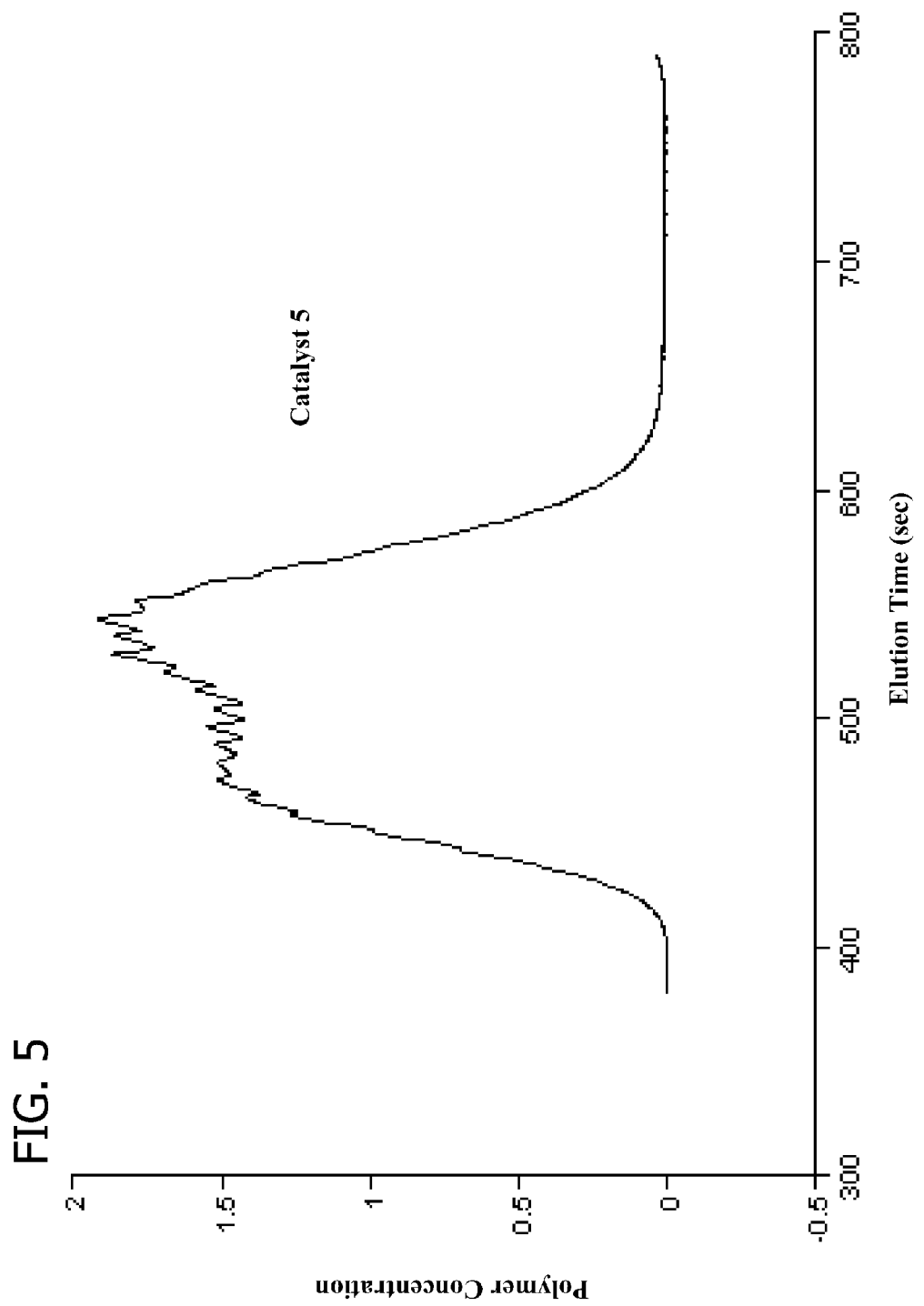
Figure 6:
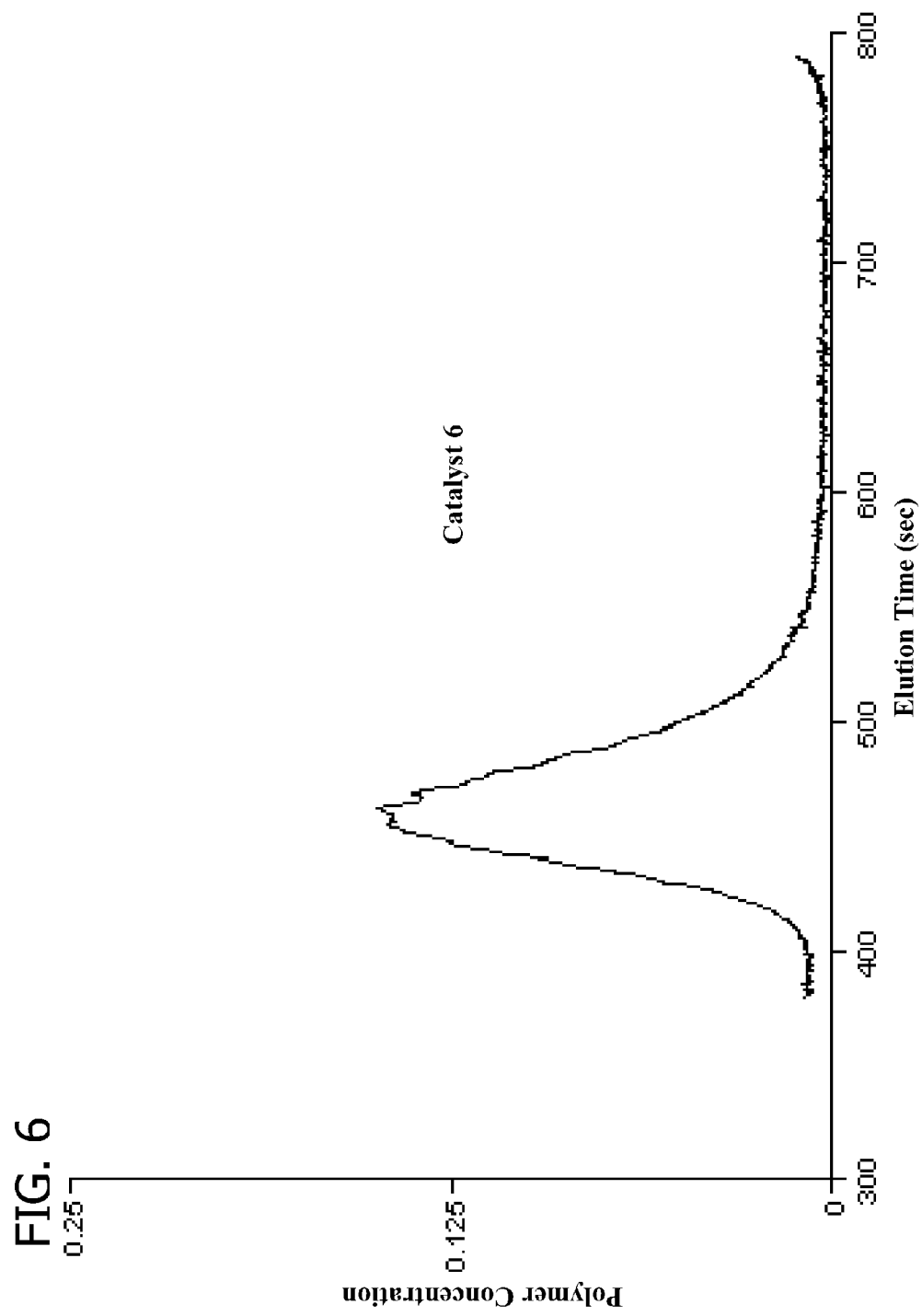
Figure 7:
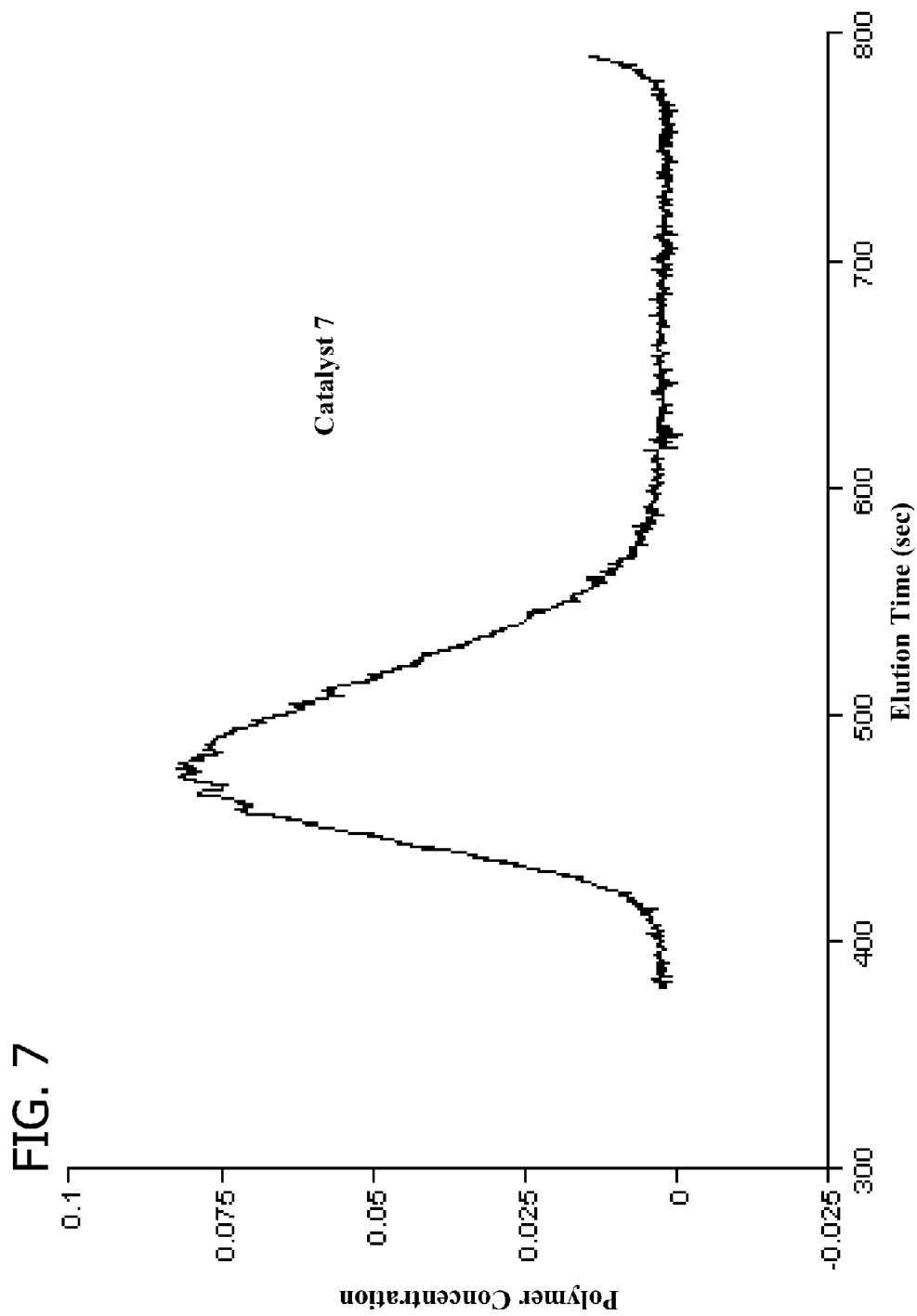
Figure 8:
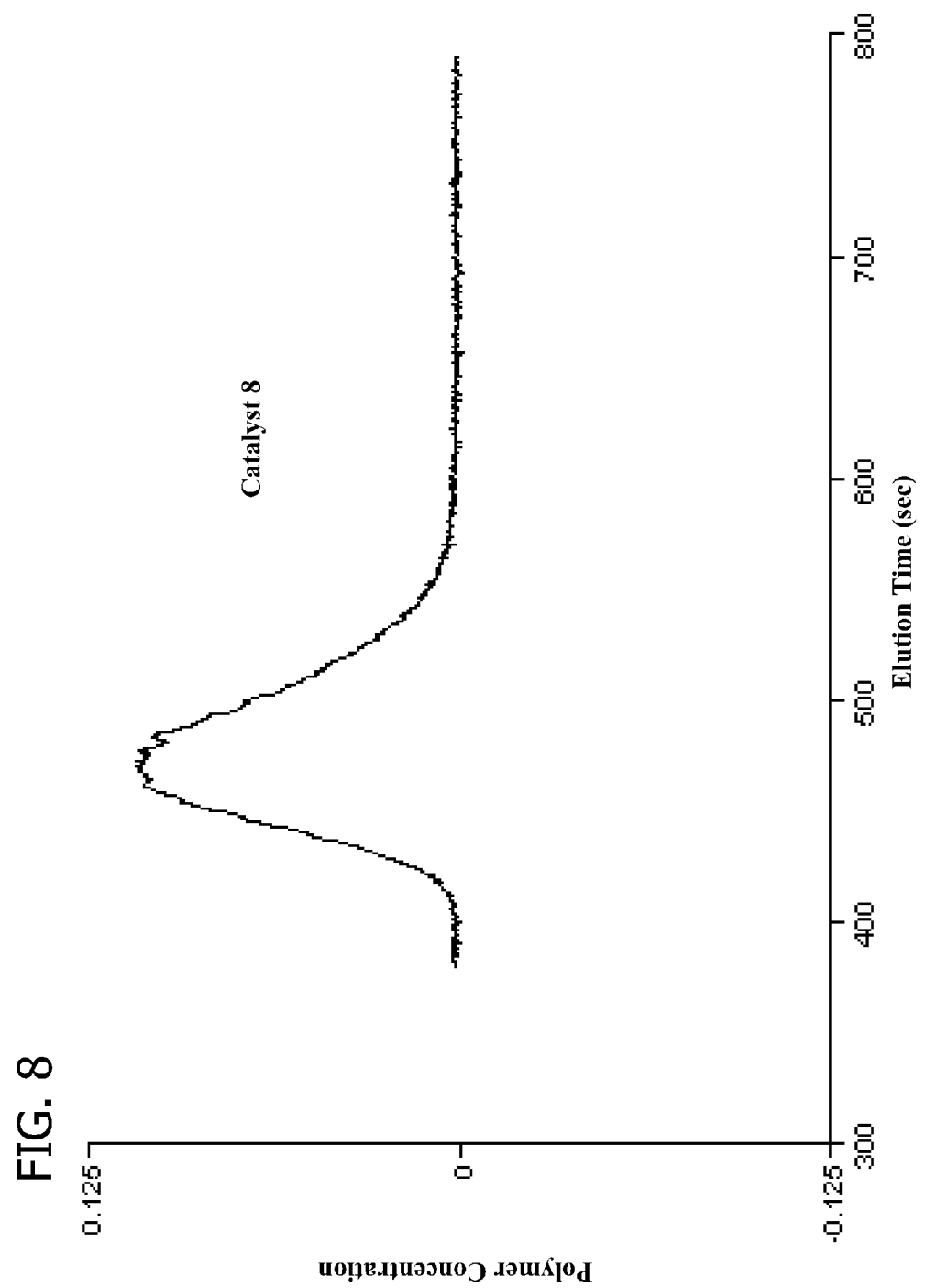

After the polymerization reaction was completed, the glass vial insert, containing the polymer product and diluent, was removed from the pressure cell and removed from the inert atmosphere dry box, and the volatile components were removed using a centrifuge vacuum evaporator. After most of the volatile components had evaporated, the vial contents were dried thoroughly by evaporation at elevated temperature under reduced pressure. The vial was then weighed to determine the yield of polymer product. The polymer product was then analyzed by Rapid GPC, as described above to determine the molecular weight and molecular weight distribution (MWD) of the polymers produced. The molecular weights & MWD are shown in Table 5. The Rapid GPC chromatograms for each corresponding product polymer are shown in FIGS. 1-8, showing the ELSD signal versus retention time for the polymer products of supported catalysts 1-8 respectively. Longer retention times correspond to lower molecular weight polymers. The figures show that narrow MWD products can be obtained from the supported catalyst 1-4 each comprising a single complex and that broaded MWD or bimodal MWD can be obtained from the co-supported catalysts 5-8 each comprising two co-supported complexes, For the high-throughput Rapid GPC method used, the separation at the highest molecular weights is not ideal, and the MWD (Mw/Mn) is underestimated. Thus, the polymer product from the polymerization example from Supported Catalyst 5 was also analyzed using conventional size exclusion chromatography using a Polymer Labs PL210 high-temperature GPC instrument as described above, to determine a more accurate MWD. This conventional method gave a Mw value of 2.6× $10^6$ and a MWD (Wm/Mn) of 13.

A number of embodiments the methods, metal-ligand complexes and supported catalysts (i.e., a support have an activator and one or more metal-ligand complexes deposited thereon) of the invention have been described. Nevertheless, it will be understood that various modifications may be made without departing from the spirit and scope of the invention. Accordingly, other embodiments are within the scope of the following claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the invention, it is intended that all matter contained in the above description and shown in the accompanying figures shall be interpreted as illustrative and not in a limiting sense.

What is claimed is:

1. A slurry polymerization method for producing a very-high or ultra-high molecular weight polyethylene composition, the method comprising contacting one or more monomers with a supported catalyst, the supported catalyst comprising:
   a support,
   a metal-ligand complex deposited on the support at a loading from about 1 μmol/gram of supported catalyst to about 100 μmol/gram of supported catalyst, the metal-ligand complex characterized by the general formula:

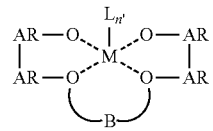

wherein the O-AR-AR-O—B—O-AR-AR-O fragment of the general formula is defined by a ligand selected from the group consisting of

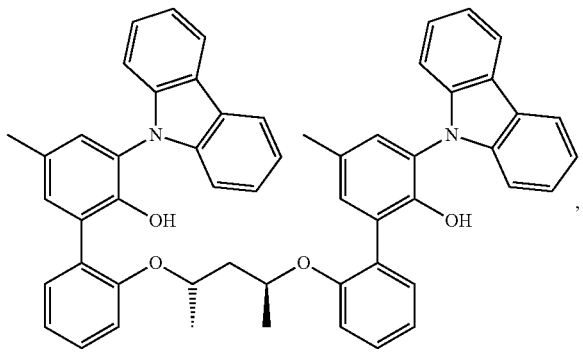

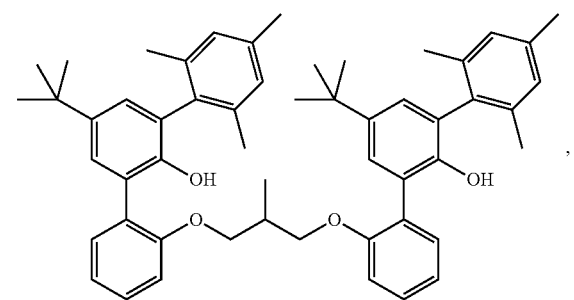

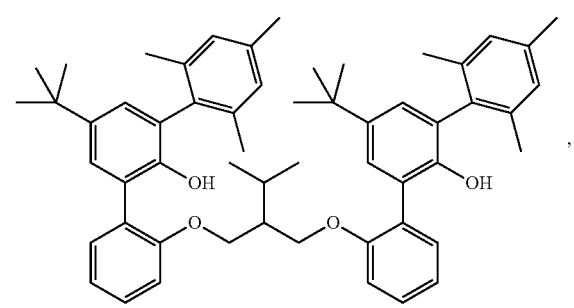

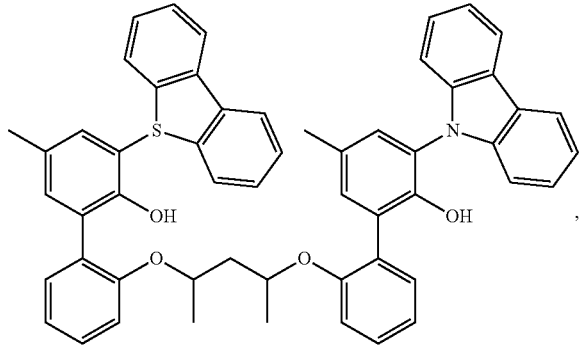

-continued

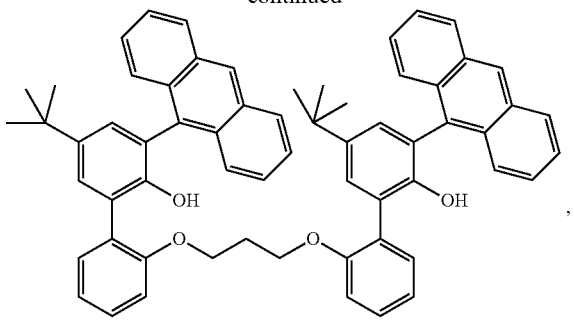

and

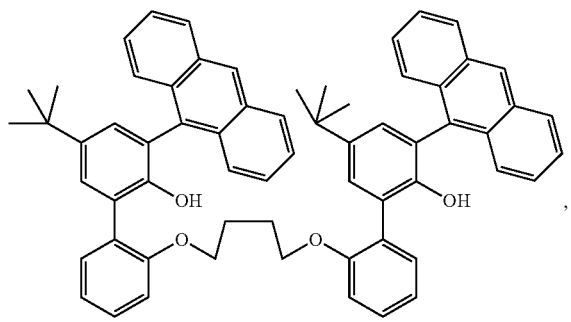

wherein at least two of the bonds from the oxygens (O) to M are covalent, with the other bonds being dative; M is a metal selected from the group consisting of Hf and Zr; each L is independently a moiety that forms a covalent dative or ionic bond with M; and n' is 1, 2, 3 or 4; and, an activator.

2. A method as set forth in claim 1 wherein the support is selected from the group consisting of silicas, aluminas, clays, zeolites, magnesium chloride, polystyrenes and substituted polystyrenes.

3. A method as set forth in claim 1 wherein the loading of the metal-ligand complex deposited on the support is from about 1 μmol/gram of supported catalyst to about 50 μmol/gram of supported catalyst.

4. A method as set forth in claim 1 wherein the polyethylene composition is an ultra-high molecular weight polyethylene composition with a weight average molecular weight of between about $3 \times 10^6$ g/mol and about $20 \times 10^6$ g/mol.

5. A method as set forth in claim 1 wherein the polyethylene composition is an ultra-high molecular weight polyethylene composition with a weight average molecular weight of between about $3 \times 10^6$ g/mol and about $15 \times 10^6$ g/mol.

6. A method as set forth in claim 1 wherein the polyethylene composition is an ultra-high molecular weight polyethylene composition with a weight average molecular weight of between about $3 \times 10^6$ g/mol and about $10 \times 10^6$ g/mol.

7. A method as set forth in claim 1 wherein the polyethylene composition is a very-high molecular weight polyethylene composition with a weight average molecular weight of between about $1 \times 10^6$ g/mol and about $3 \times 10^6$ g/mol.

8. A method as set forth in claim 1 wherein the polyethylene composition is a very-high molecular weight polyethylene composition with a weight average molecular weight of between about $2 \times 10^6$ g/mol and about $3 \times 10^6$ g/mol.

9. A method as set forth in claim 1 wherein at least two monomers are contacted with the supported catalyst.

10. A method as set forth in claim 9 wherein at least one of the monomers is ethylene and one of the monomers is an α-olefin.

11. A slurry polymerization method for producing a very-high or ultra-high molecular weight polyethylene composition, the method comprising contacting one or more monomers with a supported catalyst, the supported catalyst comprising:
a support,
a metal-ligand complex deposited on the support at a loading from about 1 μmol/gram of supported catalyst to about 100 μmol/gram of supported catalyst, the metal-ligand complex characterized by the general formula:

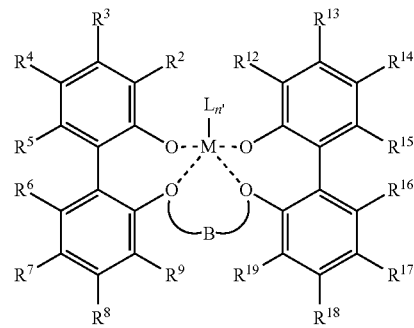

wherein at least two of the bonds from the oxygens (O) to M are covalent, with the other bonds being dative; and wherein each of $R^2$ and $R^{12}$ is

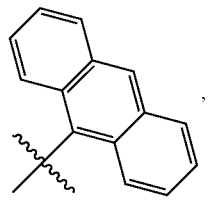 [SMILES: *c1c2ccccc2cc2ccccc12]

each of $R^3$, $R^4$, $R^5$, $R^6$, $R^7$, $R^8$, $R^9$, $R^{13}$, $R^{14}$, $R^{15}$, $R^{16}$, $R^{17}$, $R^{18}$ and $R^{19}$ is independently selected from the group consisting of hydrogen, halogen, and optionally substituted hydrocarbyl, heteroatom-containing hydrocarbyl, alkoxy, aryloxy, silyl, boryl, phosphino, amino, alkylthio, arylthio, nitro, and combinations thereof; optionally two or more R groups can combine together into ring structures, with such ring structures having from 3 to 12 atoms in the ring, not counting hydrogen atoms; B is a bridging group having from 3 to 50 atoms not counting hydrogen atoms and is selected from the group consisting of optionally substituted divalent hydrocarbyl and optionally substituted divalent heteroatom-containing hydrocarbyl; M is a metal selected from the group consisting of Hf and Zr; each L is independently a moiety that forms a covalent dative or ionic bond with M; and n' is 1, 2, 3 or 4;
wherein the O—B—O fragment is:

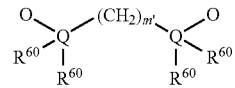

wherein each Q is independently selected from the group consisting of carbon and silicon, each $R^{60}$ is independently selected from the group consisting of hydrogen and optionally substituted hydrocarbyl and heteroatom containing hydrocarbyl, provided that at least one $R^{60}$ substituent is not hydrogen, wherein the $R^{60}$ substituents are optionally joined into a ring structure having from 3 to 50 atoms in the ring structure not counting hydrogen atoms, and m' is 0, 1, 2 or 3; and, an activator.

* * * * *